United States Patent
Sasaki et al.

(10) Patent No.: US 12,175,110 B2
(45) Date of Patent: Dec. 24, 2024

(54) MEMORY SYSTEM AND INFORMATION PROCESSING SYSTEM

(71) Applicant: KIOXIA CORPORATION, Tokyo (JP)

(72) Inventors: Yuki Sasaki, Kamakura (JP); Shinichi Kanno, Ota (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 18/509,572

(22) Filed: Nov. 15, 2023

(65) Prior Publication Data
US 2024/0086096 A1 Mar. 14, 2024

Related U.S. Application Data

(63) Continuation of application No. 17/643,611, filed on Dec. 10, 2021, now Pat. No. 11,861,197.

(30) Foreign Application Priority Data

Jun. 17, 2021 (JP) ................................. 2021-100701

(51) Int. Cl.
*G06F 3/06* (2006.01)
*G06F 12/02* (2006.01)

(52) U.S. Cl.
CPC ............ *G06F 3/064* (2013.01); *G06F 3/0604* (2013.01); *G06F 3/0631* (2013.01);
(Continued)

(58) Field of Classification Search
CPC ............. G06F 12/0246; G06F 12/0292; G06F 2212/1016; G06F 2212/7201; G06F 2212/7205
See application file for complete search history.

(56) References Cited

U.S. PATENT DOCUMENTS

| | | |
|---|---|---|
| 11,366,613 B2 | 6/2022 | Wang |
| 2013/0024604 A1 | 1/2013 | Yeh |
| | (Continued) | |

FOREIGN PATENT DOCUMENTS

| | | |
|---|---|---|
| JP | 2021-033945 A | 3/2021 |
| JP | 2022-63466 A | 4/2022 |
| TW | 201305818 A | 2/2013 |

OTHER PUBLICATIONS

Chin-Hsien WU, "An Adaptive Two-Level Management for the Flash Translation Layer in Embedded Systems", 2006. IEEE/ACM International Conference on Computer Aided Design, San Jose, CA, USA, 2006, pp. 601-606.

*Primary Examiner* — Khoa D Doan
(74) *Attorney, Agent, or Firm* — Oblon, McClelland, Maier & Neustadt, L.L.P.

(57) ABSTRACT

According to one embodiment, a memory system includes a non-volatile memory and a controller. The controller manages validity of data in the non-volatile memory using a data map. The data map includes first fragment tables. Each of the first fragment tables stores first and second information. The first information indicates the validity of each data having a predetermined size written in a range of physical address in the non-volatile memory allocated to the first fragment table. The second information indicates the validity of a plurality of data having a predetermined size in each of entries. The controller selects a write destination block based on a size of write data to be written to the non-volatile memory by a write command from a host.

20 Claims, 17 Drawing Sheets

(52) U.S. Cl.
CPC .......... *G06F 3/0659* (2013.01); *G06F 3/0679* (2013.01); *G06F 12/0292* (2013.01)

(56) References Cited

U.S. PATENT DOCUMENTS

| | | |
|---|---|---|
| 2017/0322728 A1 | 11/2017 | Huang |
| 2018/0232181 A1* | 8/2018 | Zhou ..................... G06F 3/0604 |
| 2019/0235759 A1* | 8/2019 | Sen ......................... G06F 3/065 |
| 2020/0081842 A1 | 3/2020 | Brown et al. |
| 2020/0241775 A1 | 7/2020 | Breslow |
| 2021/0064287 A1 | 3/2021 | Kanno |
| 2022/0114090 A1 | 4/2022 | Sasaki et al. |

* cited by examiner

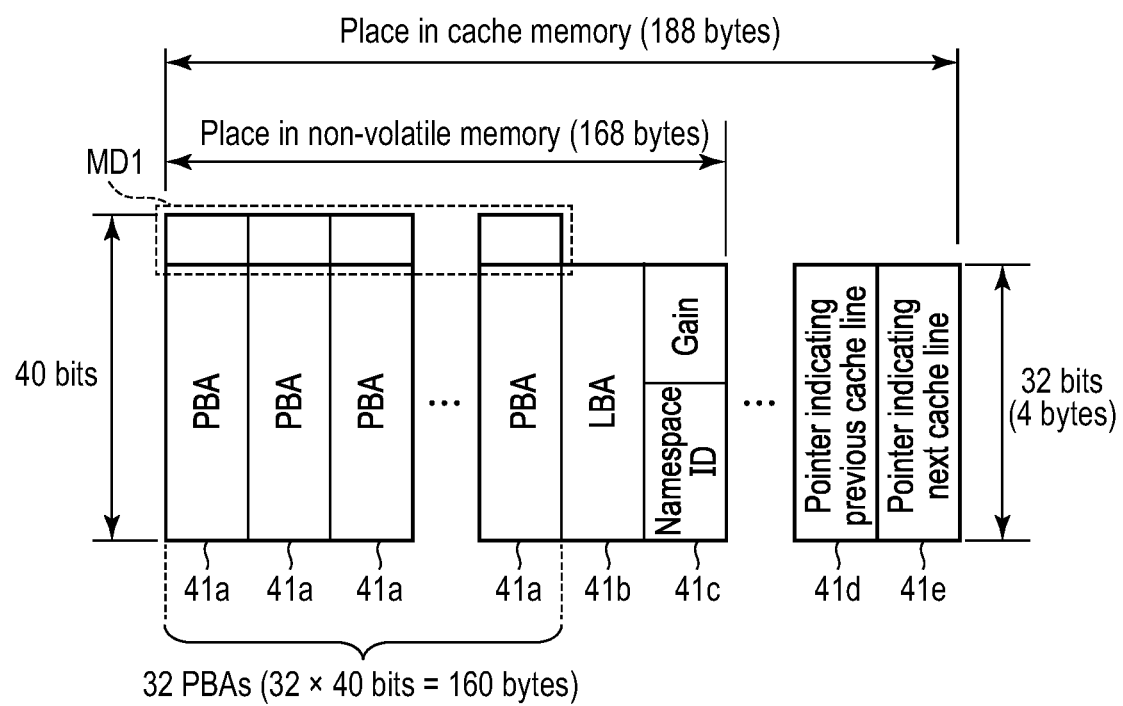
F I G. 3

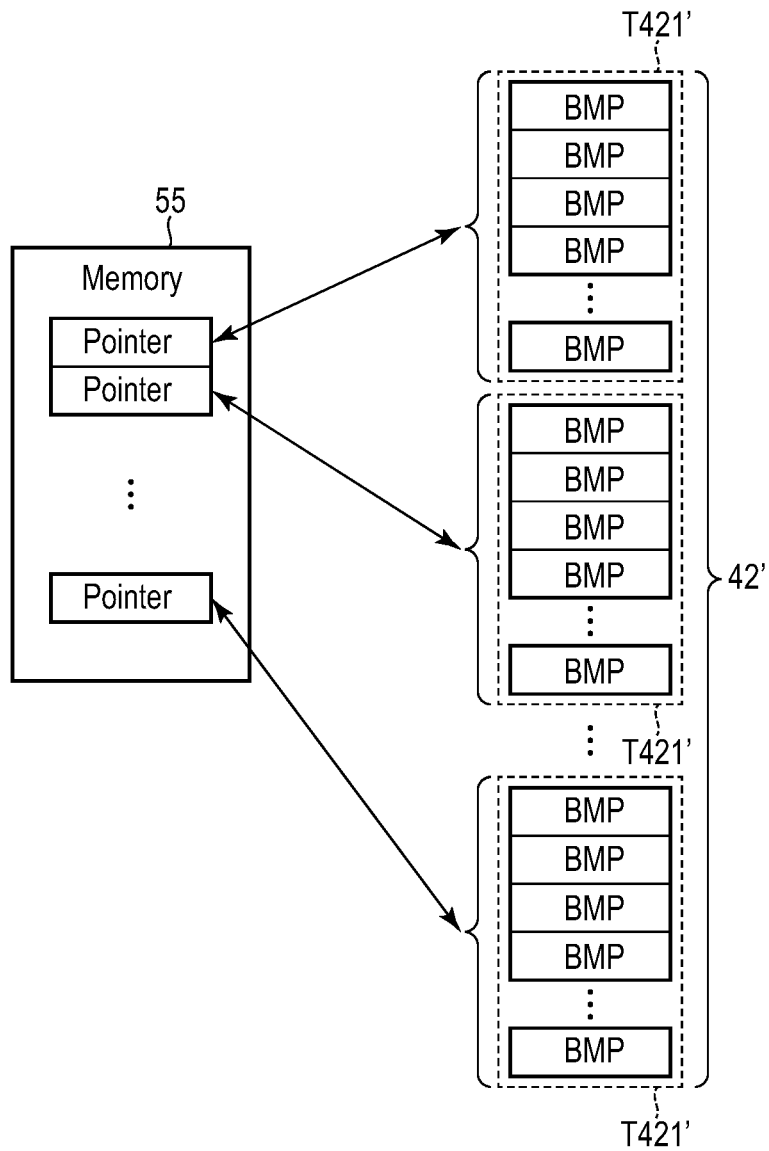
F I G. 4

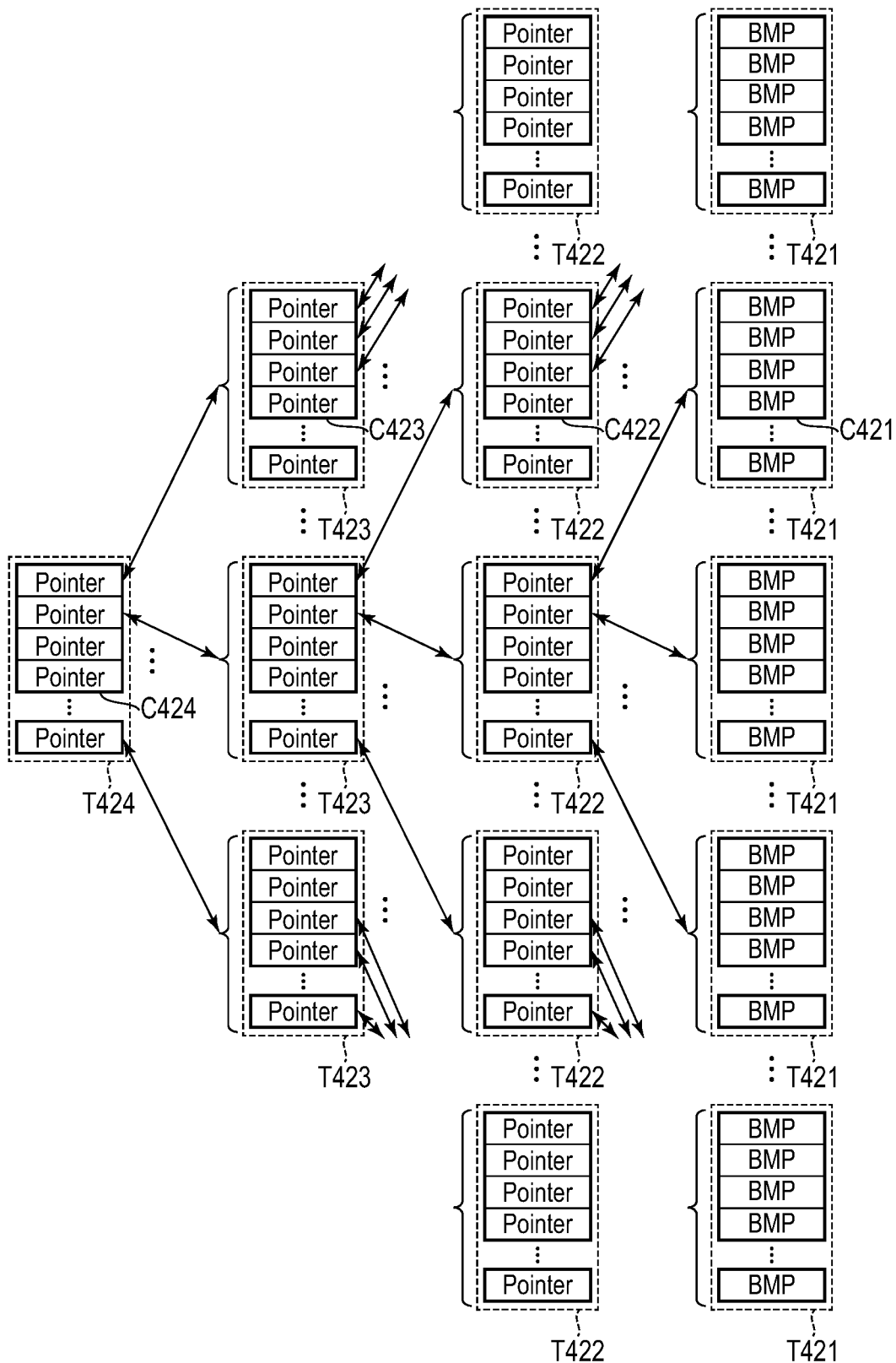
F I G. 5

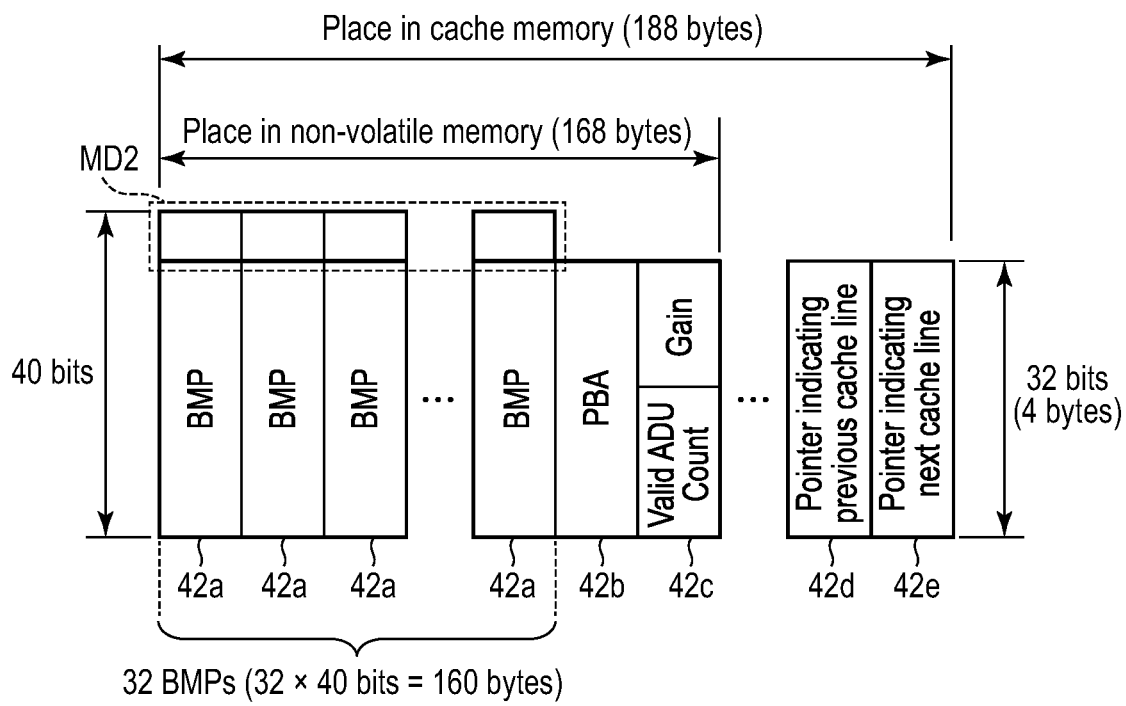
F I G. 6
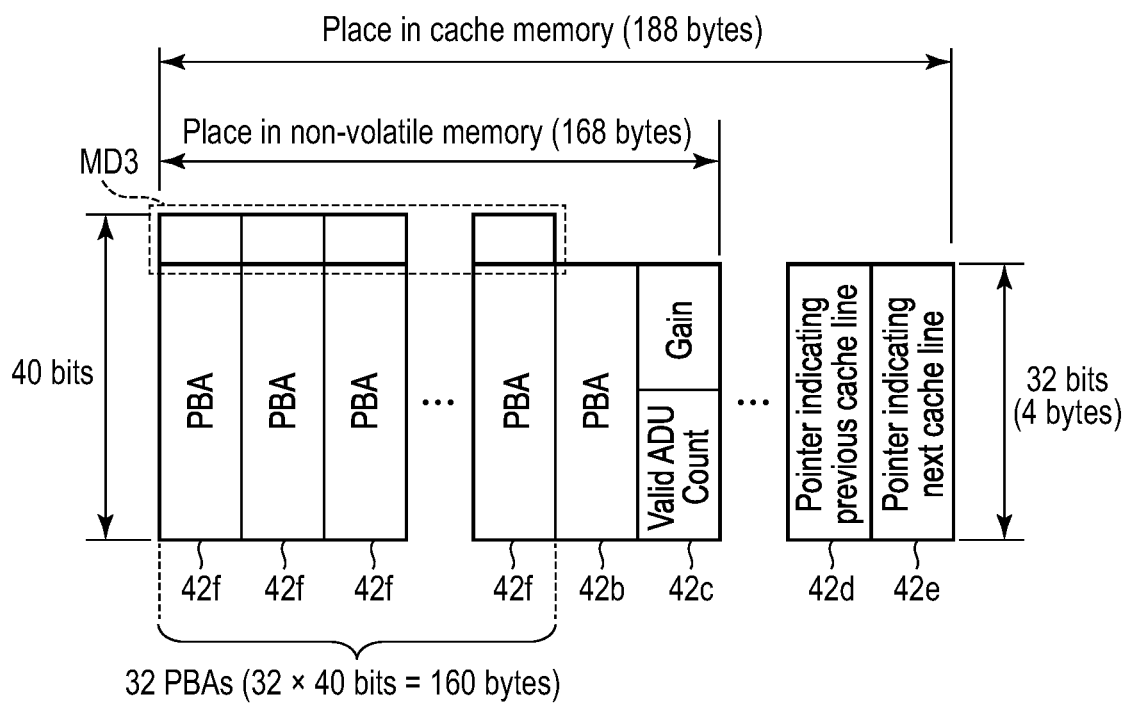
F I G. 7

N=32, M=32

|  | LUT | VDM |
|---|---|---|
| 1st hierarchy | 32 | 1024 |
| 2nd hierarchy | 1024 | 32768 |
| 3rd hierarchy | 32768 | 1048576 |
| 4th hierarchy | 1048576 | 33554432 |
| 5th hierarchy | 33554432 | 1073741824 |
| 6th hierarchy | 1073741824 | 3.436E+10 |
| 7th hierarchy | 3.436E+10 | 1.0995E+12 |
| 8th hierarchy | 1.0995E+12 | 3.5184E+13 |

|  | LUT | VDM |
|---|---|---|
| 1st hierarchy | 8 | 256 |
| 2nd hierarchy | 64 | 2048 |
| 3rd hierarchy | 512 | 16384 |
| 4th hierarchy | 4096 | 131072 |
| 5th hierarchy | 32768 | 1048576 |
| 6th hierarchy | 262144 | 8388608 |
| 7th hierarchy | 2097152 | 67108864 |
| 8th hierarchy | 16777216 | 5.37E+08 |

|  | LUT | VDM |
|---|---|---|
| 1st hierarchy | 16 | 512 |
| 2nd hierarchy | 256 | 8192 |
| 3rd hierarchy | 4096 | 131072 |
| 4th hierarchy | 65536 | 2097152 |
| 5th hierarchy | 1048576 | 33554432 |
| 6th hierarchy | 16777216 | 5.37E+08 |
| 7th hierarchy | 2.68E+08 | 8.59E+09 |
| 8th hierarchy | 4.29E+09 | 1.37E+11 |

| | LUT | VDM |
|---|---|---|
| 1st hierarchy | 64 | 2048 |
| 2nd hierarchy | 4096 | 131072 |
| 3rd hierarchy | 262144 | 8388608 |
| 4th hierarchy | 16777216 | 536870912 |
| 5th hierarchy | 1073741824 | 34359738368 |
| 6th hierarchy | 68719476736 | 2.19902E+12 |
| 7th hierarchy | 4.39805E+12 | 1.40737E+14 |
| 8th hierarchy | 2.81475E+14 | 9.0072E+15 |

| | LUT | VDM |
|---|---|---|
| 1st hierarchy | 128 | 4096 |
| 2nd hierarchy | 16384 | 524288 |
| 3rd hierarchy | 2097152 | 67108864 |
| 4th hierarchy | 2.68E+08 | 8.59E+09 |
| 5th hierarchy | 3.44E+10 | 1.1E+12 |
| 6th hierarchy | 4.4E+12 | 1.41E+14 |
| 7th hierarchy | 5.63E+14 | 1.8E+16 |
| 8th hierarchy | 7.21E+16 | 2.31E+18 |

| | LUT | VDM |
|---|---|---|
| 1st hierarchy | 64 | 4096 |
| 2nd hierarchy | 4096 | 262144 |
| 3rd hierarchy | 262144 | 16777216 |
| 4th hierarchy | 16777216 | 1073741824 |
| 5th hierarchy | 1073741824 | 68719476736 |
| 6th hierarchy | 68719476736 | 4.39805E+12 |
| 7th hierarchy | 4.39805E+12 | 2.81475E+14 |
| 8th hierarchy | 2.81475E+14 | 1.80144E+16 |

|  | LUT | VDM |
|---|---|---|
| 1st hierarchy | 8 | 512 |
| 2nd hierarchy | 64 | 4096 |
| 3rd hierarchy | 512 | 32768 |
| 4th hierarchy | 4096 | 262144 |
| 5th hierarchy | 32768 | 2097152 |
| 6th hierarchy | 262144 | 16777216 |
| 7th hierarchy | 2097152 | 1.34E+08 |
| 8th hierarchy | 16777216 | 1.07E+09 |

|  | LUT | VDM |
|---|---|---|
| 1st hierarchy | 16 | 1024 |
| 2nd hierarchy | 256 | 16384 |
| 3rd hierarchy | 4096 | 262144 |
| 4th hierarchy | 65536 | 4194304 |
| 5th hierarchy | 1048576 | 67108864 |
| 6th hierarchy | 16777216 | 1.07E+09 |
| 7th hierarchy | 2.68E+08 | 1.72E+10 |
| 8th hierarchy | 4.29E+09 | 2.75E+11 |

|  | LUT | VDM |
|---|---|---|
| 1st hierarchy | 32 | 2048 |
| 2nd hierarchy | 1024 | 65536 |
| 3rd hierarchy | 32768 | 2097152 |
| 4th hierarchy | 1048576 | 67108864 |
| 5th hierarchy | 33554432 | 2147483648 |
| 6th hierarchy | 1073741824 | 6.8719E+10 |
| 7th hierarchy | 3.436E+10 | 2.199E+12 |
| 8th hierarchy | 1.0995E+12 | 7.0369E+13 |

N=128, M=64
| | LUT | VDM |
|---|---|---|
| 1st hierarchy | 128 | 8192 |
| 2nd hierarchy | 16384 | 1048576 |
| 3rd hierarchy | 2097152 | 1.34E+08 |
| 4th hierarchy | 2.68E+08 | 1.72E+10 |
| 5th hierarchy | 3.44E+10 | 2.2E+12 |
| 6th hierarchy | 4.4E+12 | 2.81E+14 |
| 7th hierarchy | 5.63E+14 | 3.6E+16 |
| 8th hierarchy | 7.21E+16 | 4.61E+18 |
F I G. 17
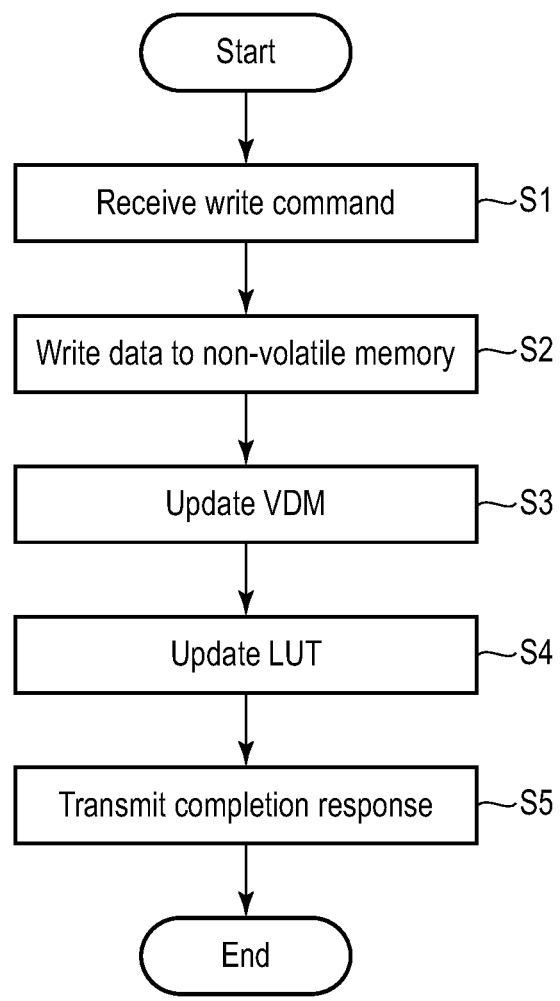
F I G. 18

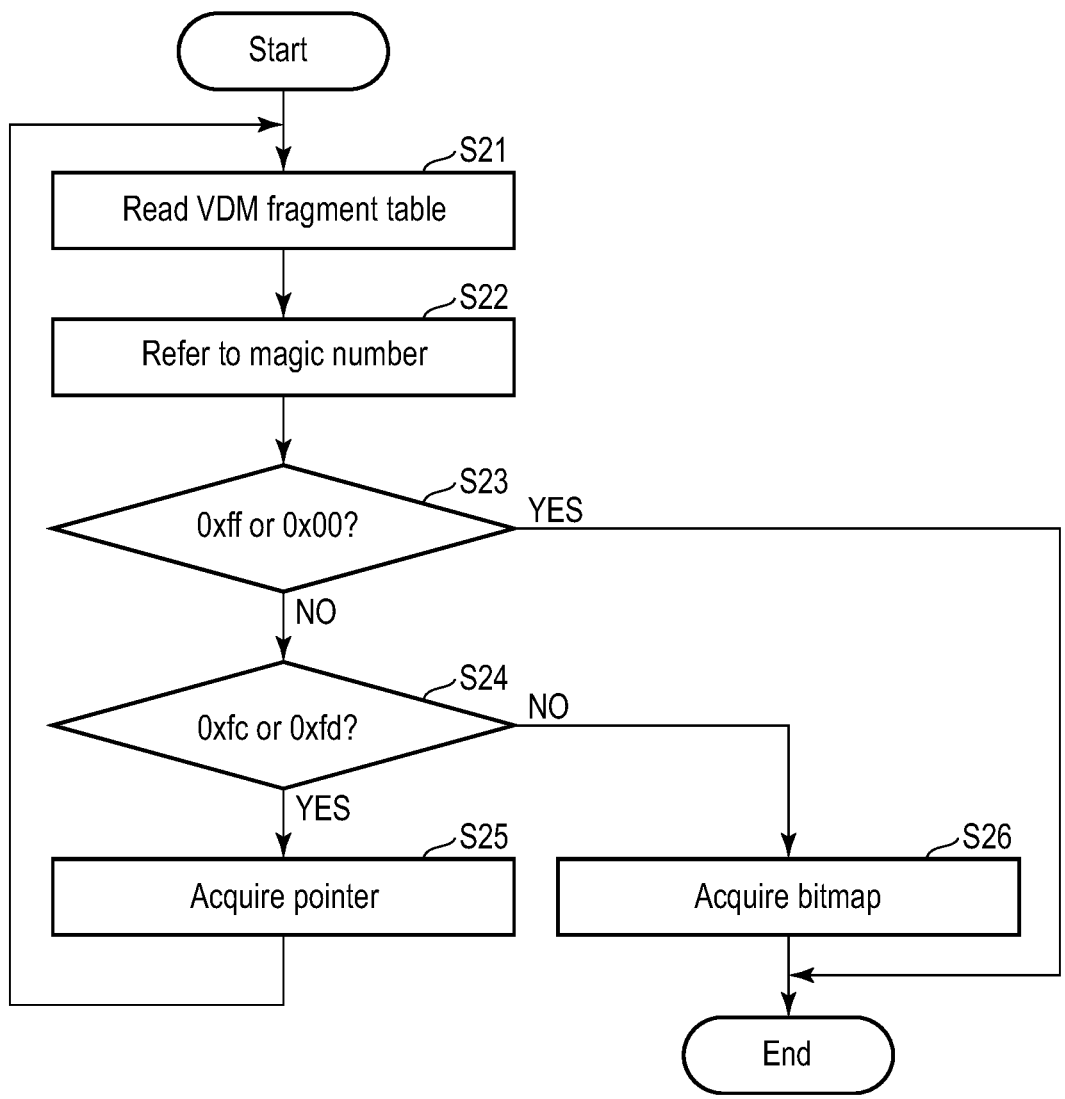
F I G. 20

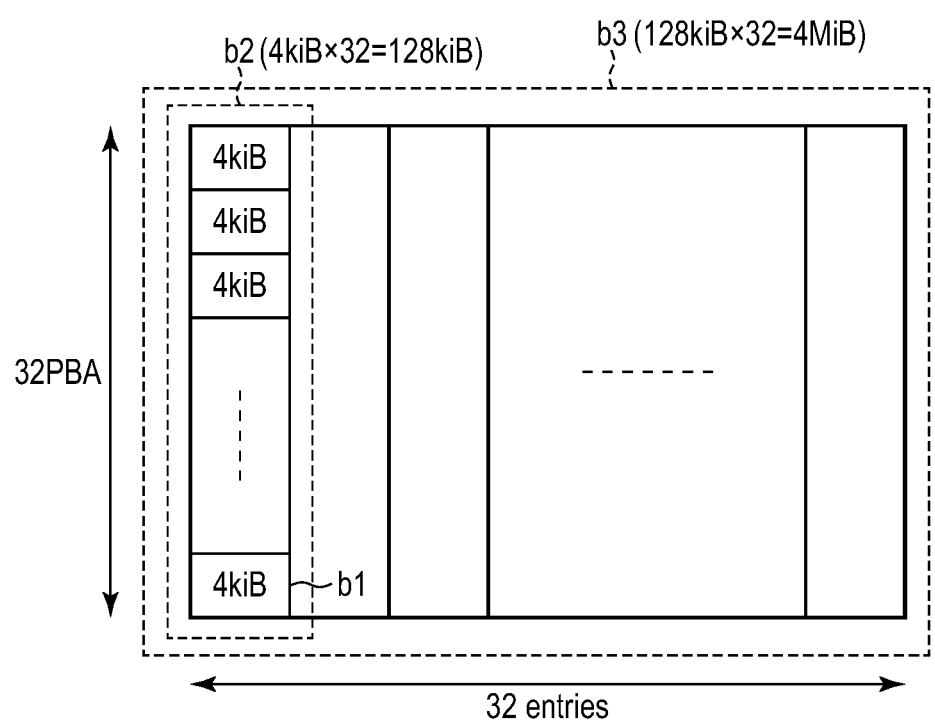
F I G. 22

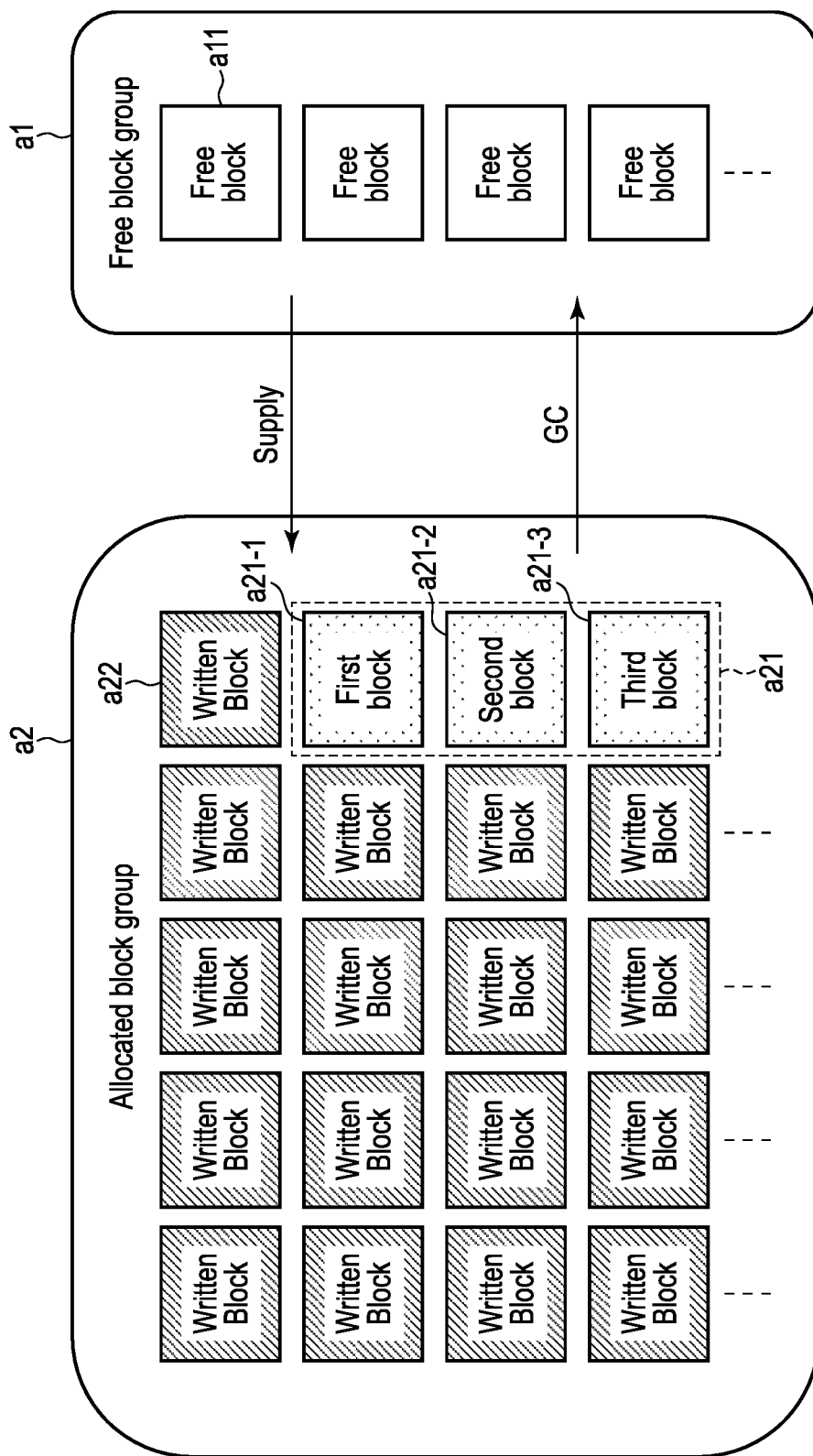
F I G. 23

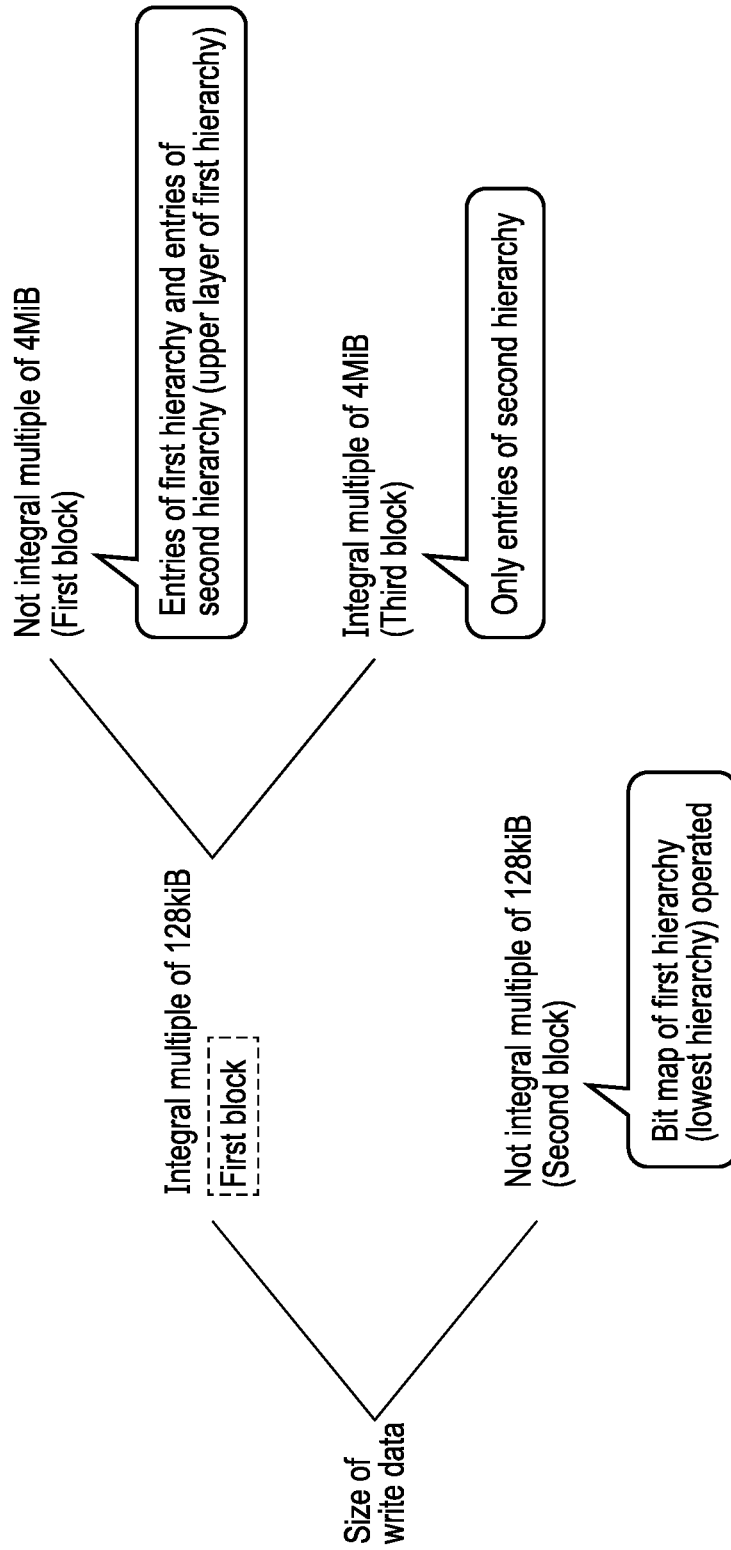
F I G. 24

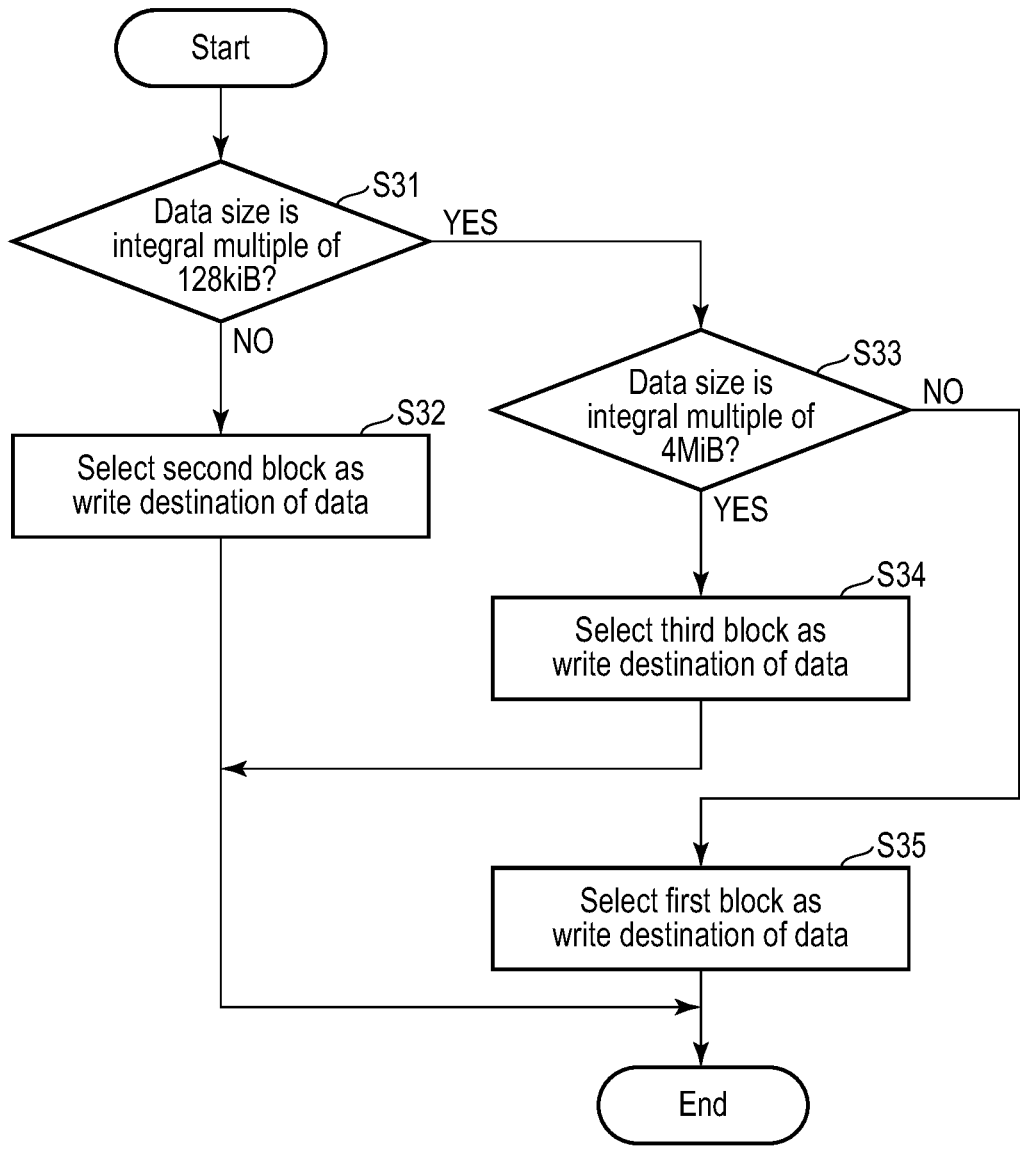
F I G. 25

MEMORY SYSTEM AND INFORMATION PROCESSING SYSTEM

CROSS-REFERENCE TO RELATED APPLICATIONS

This application is a continuation of and claims benefit under 35 U.S.C. § 120 to U.S. application Ser. No. 17/643,611 filed Dec. 10, 2021, and claims the benefit of priority under 35 U.S.C. § 119 from Japanese Patent Application No. 2021-100701 filed Jun. 17, 2021, the entire contents of each of which are incorporated herein by reference.

FIELD

Embodiments described herein relate generally to a memory system and an information processing system.

BACKGROUND

In recent years, a memory system including a non-volatile memory has become widespread. As an example of such a memory system, for example, a solid state drive (SSD) including a NAND type flash memory has been known.

Here, the validity of the data (that is, whether the data is valid or invalid) written in the above-mentioned non-volatile memory is managed by using a data map, and it is desired to efficiently manage the validity of the data. It is also desired to decrease processing costs of the data map.

BRIEF DESCRIPTION OF THE DRAWINGS

FIG. 3 is a diagram illustrating an example of a data structure of a LUT fragment table in the embodiment.

FIG. 4 is a diagram for explaining VDM in a comparative example of the embodiment.

FIG. 5 is a diagram for conceptually explaining VDM in the embodiment.

FIG. 6 is a diagram illustrating an example of a data structure of a first VDM fragment table in the embodiment.

FIG. 7 is a diagram illustrating an example of a data structure of a second VDM fragment table in the embodiment.

FIG. 8 is a diagram illustrating a relationship between the number of PBAs managed by the LUT fragment table and the number of PBAs managed by the VDM fragment table corresponding to each hierarchy in the embodiment.

FIG. 9 is a diagram illustrating a relationship between the number of PBAs managed by the LUT fragment table and the number of PBAs managed by the VDM fragment table corresponding to each hierarchy in the embodiment.

FIG. 10 is a diagram illustrating a relationship between the number of PBAs managed by the LUT fragment table and the number of PBAs managed by the VDM fragment table corresponding to each hierarchy in the embodiment.

FIG. 11 is a diagram illustrating a relationship between the number of PBAs managed by the LUT fragment table and the number of PBAs managed by the VDM fragment table corresponding to each hierarchy in the embodiment.

FIG. 12 is a diagram illustrating a relationship between the number of PBAs managed by the LUT fragment table and the number of PBAs managed by the VDM fragment table corresponding to each hierarchy in the embodiment.

FIG. 13 is a diagram illustrating a relationship between the number of PBAs managed by the LUT fragment table and the number of PBAs managed by the VDM fragment table corresponding to each hierarchy in the embodiment.

FIG. 14 is a diagram illustrating a relationship between the number of PBAs managed by the LUT fragment table and the number of PBAs managed by the VDM fragment table corresponding to each hierarchy in the embodiment.

FIG. 15 is a diagram illustrating a relationship between the number of PBAs managed by the LUT fragment table and the number of PBAs managed by the VDM fragment table corresponding to each hierarchy in the embodiment.

FIG. 16 is a diagram illustrating a relationship between the number of PBAs managed by the LUT fragment table and the number of PBAs managed by the VDM fragment table corresponding to each hierarchy in the embodiment.

FIG. 17 is a diagram illustrating a relationship between the number of PBAs managed by the LUT fragment table and the number of PBAs managed by the VDM fragment table corresponding to each hierarchy in the embodiment.

FIG. 18 is a flowchart illustrating an example of a processing procedure of the memory system according to the present embodiment when a write command is transmitted from a host.

FIG. 20 is a flowchart illustrating an example of a processing procedure of a memory system according to the embodiment when confirming whether the data written in a specific PBA in a non-volatile memory is valid or invalid.

FIG. 22 is a diagram illustrating a size of data in which each type of management data of the data map of the memory system of the embodiment manages validity.

FIG. 23 is a diagram illustrating one of usage mode examples of the blocks in the memory system of the embodiment.

FIG. 24 is a diagram illustrating one of selection examples of a write destination block of the memory system of the embodiment.

FIG. 25 is a flowchart of an example of a selection order of write destination blocks based on a data size, which is included in a data write operation of the memory system of the embodiment.

DETAILED DESCRIPTION

Various embodiments will be described hereinafter with reference to the drawings.

In general, according to one embodiment, a memory system is capable of being connected to a host. The memory system includes a non-volatile memory and a controller. The non-volatile memory includes a plurality of blocks. The controller controls write/read of data to/from the non-volatile memory in response to a command from the host. The controller manages validity of data written in the non-volatile memory using a data map. The data map includes a plurality of first fragment tables. Each of the first fragment tables stores first information and second information. The first information indicates the validity of each data having a predetermined size written in a range of physical address in the non-volatile memory allocated to the first fragment table. The second information indicates the validity of a plurality of data having a predetermined size in each of a predetermined number of entries. The controller selects a write destination block based on a size of write data requested to be written to the non-volatile memory by a write command from the host.

Figure 1:
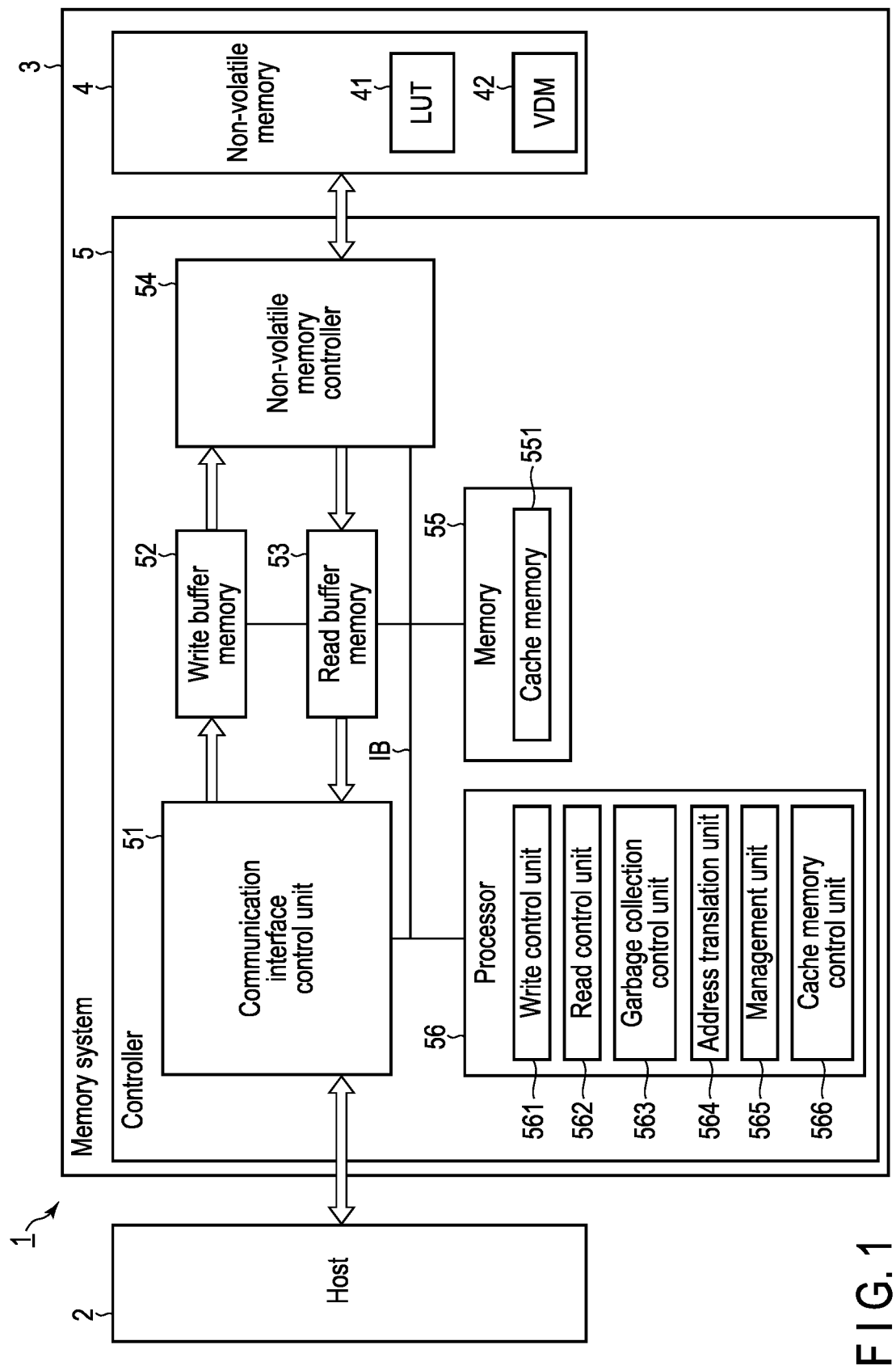
FIG. 1 is a block diagram illustrating an example of a configuration of an information processing system including a memory system according to an embodiment.

FIG. 1 is a block diagram illustrating an example of a configuration of an information processing system including a memory system according to an embodiment.

In the present embodiment, the memory system is a semiconductor storage device configured to write data (user data) to a non-volatile memory and read the data from the non-volatile memory. This memory system may be realized as, for example, a solid state drive (SSD), or may be realized as another storage device such as a memory card. In the present embodiment, it is assumed that the memory system is realized as an SSD.

As illustrated in FIG. 1, an information processing system 1 includes a host 2 and a memory system 3. The host 2 is an information processing device that operates as a host device for the memory system 3, and can be realized as, for example, a personal computer, a server device, a mobile phone, an imaging device, a mobile terminal (tablet computer, smartphone, or the like), a game machine, or an in-vehicle terminal (car navigation system or the like).

The memory system 3 is configured to be connectable to the host 2, and includes a non-volatile memory 4 and a controller 5 (control circuit) that controls writing and reading of data to the non-volatile memory 4. The non-volatile memory 4 may be configured to be detachable from the controller 5. According to this, the memory capacity of the memory system 3 can be freely expanded.

In a case where the memory system 3 is realized as an SSD as described above, the non-volatile memory 4 is, for example, a NAND type flash memory. In this case, the non-volatile memory 4 (NAND type flash memory) includes a plurality of memory cells (memory cell array) arranged in a matrix. The non-volatile memory 4 may be a NAND type flash memory having a two-dimensional structure or a NAND type flash memory having a three-dimensional structure.

Further, the memory cell array of the non-volatile memory 4 includes a plurality of blocks, and each of the blocks is organized by a large number of pages. In the memory system 3 (SSD), each block functions as a data erasing unit. In addition, each page is a unit of a data writing operation and a data reading operation.

In addition, various data are written in the non-volatile memory 4, and the non-volatile memory 4 further stores an address translation table (hereinafter, simply referred to as LUT) 41 called a look up table (LUT). The LUT 41 is also called L2P (Logical address to Physical address). The LUT 41 corresponds to the data for managing a correspondence of a logical address used when the host 2 accesses the memory system 3 (write data to the non-volatile memory 4 or read data from the non-volatile memory 4) with a physical address indicating a physical position where the data in the non-volatile memory 4 is written. In other words, the LUT 41 stores the physical address corresponding to each of the logical addresses.

In a case where the non-volatile memory 4 is a NAND type flash memory, the logical address managed by the LUT 41 is a logical block address (LBA), and the physical address is a physical block address (PBA). In the following description, the logical address will be described as LBA and the physical address will be described as PBA.

In addition, the non-volatile memory 4 further stores a data map (hereinafter, simply referred to as VDM) 42 called a valid data map (VDM). The VDM 42 corresponds to the data for managing the validity of the data written to the physical address in the non-volatile memory 4 (that is, whether the data is valid or invalid).

At least one of the LUT 41 and the VDM 42 may be stored in a non-volatile memory other than the non-volatile memory 4, for example. Further, the non-volatile memory 4 may be configured to divide the memory (region) for storing the data, the LUT 41, and the VDM 42.

The controller 5 includes a communication interface control unit 51, a write buffer memory 52, a read buffer memory 53, a non-volatile memory controller 54, a memory 55, and a processor 56. The communication interface control unit 51, the write buffer memory 52, the read buffer memory 53, the non-volatile memory controller 54, the memory 55, and the processor 56 are electrically connected via an internal bus IB.

The communication interface control unit 51 controls communication between an external device (for example, the host 2) and the memory system 3. Specifically, the communication interface control unit 51 receives various commands from the host 2. Various commands from the host 2 include, for example, a write command (write request) and a read command (read request).

Here, the write command received by the communication interface control unit 51 includes data written to the non-volatile memory 4 based on the write command and an LBA used by the host 2 to access the data. Further, the read command received by the communication interface control unit 51 includes an LBA (that is, the LBA corresponding to the data) used when the host 2 accesses the data read based on the read command.

Here, when the write command is received by the communication interface control unit 51, the data is written in the non-volatile memory 4 based on the write command. The write buffer memory 52 temporarily stores the data written in the non-volatile memory 4. The data stored in the write buffer memory 52 is written in the non-volatile memory 4 via the non-volatile memory controller 54.

On the other hand, when the read command is received by the communication interface control unit 51, the data is read from the non-volatile memory 4 based on the read command, and the read buffer memory 53 temporarily stores data read from the non-volatile memory 4 by the non-volatile memory controller 54. The data stored in the read buffer memory 53 is transmitted to the host 2 via the communication interface control unit 51.

The non-volatile memory controller 54 controls writing data to the non-volatile memory 4 and reading data from the non-volatile memory 4. Although detailed description will be omitted, the non-volatile memory controller 54 may be configured to include a direct memory access controller (DMAC), an error correction unit, a randomizer (or a scrambler), and the like.

The memory 55 is a main memory device used as a working memory of the processor 56. The memory 55 is, for example, a dynamic random access memory (DRAM), and may be another semiconductor memory such as a static random access memory (SRAM).

The memory 55 can be written and read at a higher speed as compared with the non-volatile memory 4, and includes (a region used as) a cache memory 551. The cache memory 551 stores cache data such as LUT 41 and VDM 42 stored in the non-volatile memory 4, for example.

The processor 56 controls the operation of the entire controller 5 via the internal bus IB. The processor 56 executes various processes (for example, processes for various commands received from the host 2) by executing a control program (firmware) stored in, for example, a read only memory (ROM) (not shown).

In the present embodiment, the controller 5 functions as a flash translation layer (FTL) configured to perform data management and block management of the non-volatile memory 4 (NAND type flash memory) by such a processor 56.

The processor 56 may be, for example, a central processing unit (CPU), a micro-processing unit (MPU), and a digital signal processor (DSP).

By executing the above-described control program, the processor 56 realizes functional units such as a write control unit 561, a read control unit 562, a garbage collection control unit 563, an address translation unit 564, a management unit 565, and a cache memory control unit 566.

Each of these units 561 to 566 is realized by a control program (that is, software) as described above, and may be realized by hardware or by a combination of software and hardware.

In a case where the write command is received by the communication interface control unit 51, the write control unit 561 controls the communication interface control unit 51, the write buffer memory 52, and the non-volatile memory controller 54, and causes the non-volatile memory 4 to execute a writing process for the data included in the write command.

In a case where the read command is received by the communication interface control unit 51, the read control unit 562 controls the communication interface control unit 51, the read buffer memory 53, and the non-volatile memory controller 54, and causes the non-volatile memory 4 to execute a reading process for the data corresponding to LBA included in the read command.

The garbage collection control unit 563 executes garbage collection (GC) for the non-volatile memory 4 with reference to the above-described VDM 42 by cooperating with the write control unit 561, the read control unit 562, and the non-volatile memory controller 54, for example. The garbage collection is a process of releasing an unnecessary memory region of the non-volatile memory 4. Note that compaction that eliminates fragmentation of the memory region of the non-volatile memory 4 may be performed together with the garbage collection.

When the above-mentioned read command is received by the communication interface control unit 51, the address translation unit 564 executes a process of converting the LBA included in the read command into a PBA (physical address) by using the LUT 41 stored in the non-volatile memory 4. In the memory system 3, it is possible to read data (data corresponding to the LBA) from the non-volatile memory 4 based on the PBA translated from the LBA by the address translation unit 564 in this way.

The management unit 565 executes a process of updating the LUT 41 and the VDM 42 when the above-described write command is received by the communication interface control unit 51, and data is written in the non-volatile memory 4 based on the write command.

The cache memory control unit 566 executes a process of reading (a part of) the LUT 41 or (a part of) the VDM 42 from the non-volatile memory 4 via, for example, the read control unit 562, and storing the LUT 41 or the VDM 42 in the cache memory 551. Further, the cache memory control unit 566 executes a process of reading (a part of) the LUT 41 or (a part of) the VDM 42 stored in the cache memory 551 via the write control unit 561 and writing (writing back) the LUT 41 or VDM 42 into the non-volatile memory 4.

Although the example in which the memory system 3 is provided outside the host 2 has been illustrated in FIG. 1, MVMe over Fabrics or the like may be used as the interface between the host 2 and the memory system 3. Further, the memory system 3 may be built in the host 2. Further, the memory system 3 may be connected to a plurality of hosts 2, or a plurality of memory systems 3 may be connected to one or more hosts 2.

Here, in the above-mentioned LUT 41, the correspondence between the LBA (logical address) and the PBA (physical address) is managed. For example, when a write command from the host 2 is received by the communication interface control unit 51 and the data is written to the non-volatile memory 4 based on the write command, the management unit 565 needs to update the correspondence between the LBA included in the write command and the PBA in the non-volatile memory 4 in which the data is written, in the LUT 41 (that is, needs to register the correspondence in LUT 41).

However, when wide LBA ranges are designated in the above-mentioned write command, it takes time to update the correspondence between LBA and PBA in LUT 41.

Therefore, it is assumed that the LUT 41 in the present embodiment has a hierarchical structure formed of a plurality of hierarchies and is configured to include a plurality of tables (hereinafter, referred to as LUT fragment tables) corresponding to the plurality of hierarchies. The hierarchical structure of the LUT 41 is determined based on the setting information of the memory system 3 including the capacity of the non-volatile memory 4, for example.

In such a LUT 41, it is assumed that each of the plurality of LUT fragment tables has the same size, for example. Further, as will be described in detail later, in the LUT fragment table corresponding to the upper hierarchy among the plurality of LUT fragment tables corresponding to the plurality of hierarchies, (the range of) LBA, reference destination information (hereinafter, referred to as a LUT pointer) for referencing the LUT fragment table corresponding to the hierarchy lower than the LUT fragment table, and the like are stored. The LUT pointer includes, for example, the PBA in the non-volatile memory 4 in which the LUT fragment table to be a reference destination is stored. Further, in the LUT fragment table corresponding to the lowest hierarchy in the hierarchical structure of the LUT 41, the PBA corresponding to each of the LBAs allocated to the LUT fragment table is stored.

That is, the LUT 41 in the present embodiment has a hierarchical structure in which the LUT fragment table corresponding to the upper hierarchy can be sequentially referred to from the LUT fragment table corresponding to the lower hierarchy, and the correspondence between LBA and PBA in the hierarchical structure is managed.

Hereinafter, the LUT 41 having a hierarchical structure will be conceptually described with reference to FIG. 2. In the example illustrated in FIG. 2, it is assumed that the LUT 41 has a hierarchical structure formed of four hierarchies. In this case, the LUT 41 includes a plurality of first LUT fragment tables T411 to a fourth LUT fragment table T414.

Figure 2:
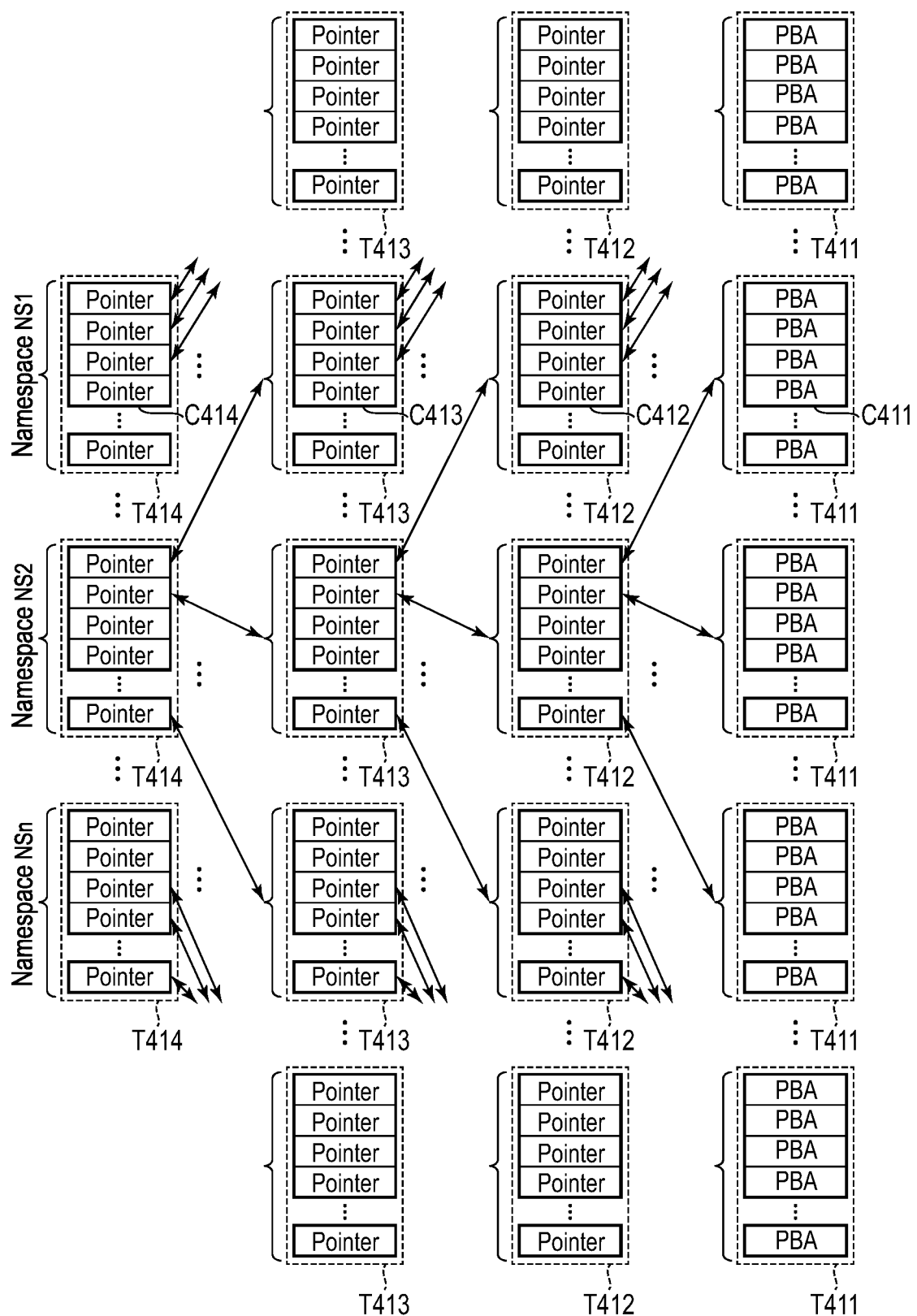
FIG. 2 is a diagram for conceptually explaining LUT in the embodiment.

As illustrated in FIG. 2, the first LUT fragment table T411 is a LUT fragment table corresponding to the lowest hierarchy (hereinafter referred to as a first hierarchy) in the hierarchical structure of the LUT 41. The second LUT fragment table T412 is a LUT fragment table corresponding to a higher hierarchy (hereinafter, referred to as a second hierarchy) of the first LUT fragment table T411 in the hierarchical structure of the LUT 41. The third LUT fragment table T413 is a LUT fragment table corresponding to a higher hierarchy (hereinafter, referred to as a third hierarchy) of the second LUT fragment table T412 in the hierarchical structure of the LUT 41. The fourth LUT fragment table T414 is a LUT fragment table corresponding to a higher hierarchy (hereinafter, referred to as a fourth hierarchy) of the third LUT fragment table T413 in the hierarchical structure of the LUT 41. In the example illustrated in FIG. 2, the fourth hierarchy is the highest hierarchy in the hierarchical structure of the LUT 41.

Hereinafter, each of the above-mentioned first LUT fragment table T411 to fourth LUT fragment table T414 will be described in detail.

First, consecutive LBA ranges are allocated to each of the plurality of first LUT fragment tables T411, and the first LUT fragment table T411 includes a plurality of entries C411. Further, for each of the plurality of entries C411 included in the first LUT fragment table T411, one different LBA from the LBA ranges allocated to the first LUT fragment table T411 is allocated, and the PBA corresponding to the LBA (that is, the PBA in which the data corresponding to the LBA is written) is stored.

In the present embodiment, the entire LBA ranges used by the host 2 to access the memory system 3 are divided into the number of the first LUT fragment tables T411, and the divided LBA range is allocated to each of the first LUT fragment table T411. With this, in the plurality of the first LUT fragment tables T411, it is possible to manage the PBA corresponding to each of the entire range of LBAs used by the host 2 when accessing the memory system 3.

Next, wider LBA ranges than those of the first LUT fragment table T411 described above are allocated to each of the plurality of second LUT fragment tables T412, and the second LUT fragment table T412 includes a plurality of entries C412. Further, for each of the plurality of entries C412 included in the second LUT fragment table T412, the LBA ranges allocated to the first LUT fragment table T411 corresponding to the lower hierarchy of the second LUT fragment table T412 are allocated, and the LUT pointer indicating (position) of the first LUT fragment table T411 is stored. In this case, the LBA ranges allocated to each of the second LUT fragment table T412 correspond to the LBA ranges allocated to all the first LUT fragment tables T411 indicated by the LUT pointers stored in each of the plurality of entries C412 included in the second LUT fragment table T412.

Further, wider LBA ranges than those of the second LUT fragment table T412 described above are allocated to each of the plurality of third LUT fragment tables T413, and the third LUT fragment table T413 includes a plurality of entries C413. Further, for each of the plurality of entries C413 included in the third LUT fragment table T413, the LBA ranges allocated to the second LUT fragment table T412 corresponding to the lower hierarchy of the third LUT fragment table T413 are allocated, and the LUT pointer indicating (position) of the second LUT fragment table T412 is stored. In this case, the LBA ranges allocated to each of the third LUT fragment table T413 correspond to the LBA ranges allocated to all the second LUT fragment tables T412 indicated by the LUT pointers stored in each of the plurality of entries C413 included in the third LUT fragment table T413.

Further, wider LBA ranges than those of the third LUT fragment table T413 described above are allocated to each of the plurality of fourth LUT fragment tables T414, and the fourth LUT fragment table T414 includes a plurality of entries C414. In addition, for each of the plurality of entries C414 included in the fourth LUT fragment table T414, the LBA ranges allocated to the third LUT fragment table T413 corresponding to the lower hierarchy of the fourth LUT fragment table T414 are allocated, and the LUT pointer indicating (position) of the third LUT fragment table T413 is stored. In this case, the LBA ranges allocated to each of the fourth LUT fragment table T414 correspond to the LBA ranges allocated to all the third LUT fragment tables T413 indicated by the LUT pointers stored in each of the plurality of entries C414 included in the fourth LUT fragment table T414.

Here, each of the plurality of fourth LUT fragment tables T414 corresponding to the fourth hierarchy (that is, the highest hierarchy in the hierarchical structure) corresponds to each of the plurality of namespaces. The namespace is a region obtained by logically dividing a memory region (plurality of blocks) included in the non-volatile memory 4. By allocating a namespace for each memory region in a predetermined range, for example, even if LBAs overlap in two or more memory regions, it is possible to access to appropriate data by using the namespace ID (identification information for identifying the namespace) and LBA. According to this, access to different namespaces can be treated in the same way as access to different devices.

In FIG. 2, the plurality of fourth LUT fragment tables T414 correspond to the namespaces NS1 to NSn (n is a natural number of 2 or more). In this case, the number of the plurality of fourth LUT fragment tables T414 is n.

As illustrated in FIG. 2, the LUT 41 has a hierarchical structure for each of (the fourth LUT fragment table T414 corresponding to) the namespaces NS1 to NSn, and the number of hierarchies for each of the namespaces NS1 to NSn is determined according to (size of) the memory region allocated to the namespace NS1 to NSn. For example, in a case where the memory region allocated to the namespace is small, the number of hierarchies of the namespace is small. On the other hand, in a case where the memory region allocated to the namespace is large, the number of hierarchies of the namespace is large. In the example illustrated in FIG. 2, a case where the number of hierarchies in each of the namespaces NS1 to NSn is the same is indicated.

In the LUT 41 having the hierarchical structure illustrated in FIG. 2 described above, the LUT pointer stored in each of the entries C414 included in the fourth LUT fragment table T414 corresponding to the fourth hierarchy (the highest hierarchy) indicates the third LUT fragment table T413 corresponding to the third hierarchy, the LUT pointer stored in each of the entries C413 included in the third LUT fragment table T413 indicates the second LUT fragment table T412 corresponding to the second hierarchy, the LUT pointer stored in each of the entries C412 included in the second LUT fragment table T412 indicates the first LUT fragment table T411 corresponding to the first hierarchy (the lowest hierarchy), and the entry C411 included in the first LUT fragment table T411 is configured to store the PBA corresponding to the LBA.

According to such a LUT 41, the PBA corresponding to the LBA can be specified by sequentially referring to the fourth LUT fragment table T414, the third LUT fragment table T413, the second LUT fragment table T412, and the first LUT fragment table T411 based on the LBA designated in various commands (LBA included in various commands).

Here, in the example illustrated in FIG. 2, the first LUT fragment table T411 is a LUT fragment table corresponding to the lowest hierarchy in the hierarchical structure of the LUT 41, and the PBA corresponding to one LBA is stored in each of the entries C411 included in the first LUT fragment table T411. In this case, assuming that the size of the data written in a PBA is 4 KiB and the first LUT fragment table T411 includes 32 entries C411, 32 LBA ranges (that is, LBAs for accessing 128 KiB data) are allocated to the first LUT fragment table T411 corresponding to the first hierarchy.

Similarly, assuming that the second LUT fragment table T412 includes 32 entries C412, and the LUT pointer indicating the first LUT fragment table T411 to which 32 LBAs are allocated to access 128 KiB data is stored in each of the entries C412 (that is, 32 LBA ranges allocated to the first LUT fragment table T411 are allocated to each of the entries C412), 32×32=1024 LBA ranges (that is, LBAs for accessing 4 MiB data) are allocated to the second LUT fragment table T412 corresponding to the second hierarchy.

Further, assuming that the one third LUT fragment table T413 includes 32 entries C413, and the LUT pointer indicating the second LUT fragment table T412 to which 1,024 LBAs are allocated to access 4 MiB data is stored in each of the entries C413 (that is, 1,024 LBA ranges allocated to the second LUT fragment table T412 are allocated to each of the entries C413), 1,024×32=32,768 LBA ranges (that is, LBAs for accessing 128 MiB data) are allocated to the one third LUT fragment table T413 corresponding to the third hierarchy.

In addition, assuming that the fourth LUT fragment table T414 includes 32 entries C414, and the LUT pointer indicating the third LUT fragment table T413 to which 32, 768 LBAs are allocated to access 128 MiB data is stored in each of the entries C414 (that is, 32,768 LBA ranges allocated to the third LUT fragment table T413 are allocated to each of the entries C414), 32,768×32=1,048,576 LBA ranges (that is, LBAs for accessing 4 GiB data) are allocated to the fourth LUT fragment table T414 corresponding to the fourth hierarchy.

That is, in an example of the LUT 41 illustrated in FIG. 2, each of the first LUT fragment tables T411 manages the LBA ranges for accessing 128 KiB data, each of the second LUT fragment tables T412 manages the LBA ranges for accessing 4 MiB data, each of the third LUT fragment tables T413 manages the LBA ranges for accessing 128 MiB data, and each of the fourth LUT fragment tables T414 manages the LBA ranges for accessing 4 GiB data.

In FIG. 2, an example in which the LUT pointer is stored in each of the plurality of entries C414 included in the fourth LUT fragment table T414 is illustrated; however, in a case where the plurality of third LUT fragment tables T413 indicated by each of the LUT pointers are continuously arranged in the non-volatile memory 4, the fourth LUT fragment table T414 may be configured to store only an LUT pointer indicating the first third LUT fragment table T413 of the plurality of the third LUT fragment tables T413 (that is, configured to omit the LUT pointer indicating the third LUT fragment table T413 that is not the first). According to this, it is possible to reduce the size of the LUT 41. Here, the fourth LUT fragment table T414 has been described, but the same applies to other LUT fragment tables.

Further, for example, when the continuity of the PBA in the non-volatile memory 4 in which the data corresponding to the LBA ranges allocated to one LUT fragment table is written is guaranteed, it is also possible to omit the LUT fragment table corresponding to the hierarchy lower than the LUT fragment table (that is, indicated by the LUT pointer stored in the entry included in the LUT fragment table).

Specifically, for example, the second LUT fragment table T412 manages the LBA ranges for accessing 4 MiB data, but in a case where the 4 MiB data accessed by the LBA managed by the second LUT fragment table T412 is written in the continuous PBA, the entries C413 included in the third LUT fragment table T413 may store the first PBA in which the 4 MiB data is written, instead of the LUT pointer indicating the second LUT fragment table T412. According to this, since it is not necessary to refer to the second LUT fragment table T412 and the first LUT fragment table T411 lower than the third LUT fragment table T413, the LUT 41 can be referred to efficiently and the access speed for the data written in the non-volatile memory 4 can be improved.

FIG. 3 is a diagram illustrating an example of a data structure of the LUT fragment table included in LUT 41 in the present embodiment. Here, the data structure of the first LUT fragment table T411 will be mainly described.

The first LUT fragment table T411 includes, for example, a plurality of PBA storing units 41a, an LBA storing unit 41b, and a management data storing unit 41c.

The PBA storing unit 41a corresponds to the entry C411 included in the first LUT fragment table T411 illustrated in FIG. 2. That is, the number of PBA storing units 41a is, for example, 32. The PBA storing unit 41a stores the PBA (that is, the PBA in which the data corresponding to the LBA is written) corresponding to one LBA allocated to the PBA storing unit 41a (entry C411). In a case where the data corresponding to one LBA allocated to the PBA storing unit 41a is stored in the cache memory 551, the address information (PBA) in the cache memory 551 is stored in the PBA storing unit 41a. The size of the PBA stored in the PBA storing unit 41a is, for example, 32 bits.

Further, for example, 8-bit management data MD1 is attached to the PBA stored in the PBA storing unit 41a, and the management data MD1 is stored in the PBA storing unit 41a together with the PBA. The management data MD1 attached to the PBA in this way includes, for example, data for managing whether the PBA is a PBA in the non-volatile memory 4 or the address information in the cache memory 551.

In this case, each size of the PBA storing unit 41a is 40 bits, which is the sum of the size of the PBA (32 bits) and the size of the management data MD1 (8 bits), and the total size of the 32 PBA storing units 41a is 160 bytes.

The LBA storing unit 41b stores the first LBA in the LBA ranges allocated to the first LUT fragment table T411.

The management data storing unit 41c stores a namespace ID for identifying the namespace to which the first LUT fragment table T411 belongs and Grain corresponding to the LBA ranges allocated to the first LUT fragment table T411 (the LBA ranges managed by the first LUT fragment table T411).

In addition, other information may be stored in the management data storing unit 41c. Specifically, the management data storing unit 41c may store identification information (hierarchy ID) or the like for identifying the hierarchy (first hierarchy) corresponding to the first LUT fragment table T411.

Here, for example, when the LUT 41 is updated in the present embodiment, a part of the LUT 41 (LUT fragment table to be updated) is stored in the cache memory 551. In this case, a part of the LUT 41 is stored in a cache line unit. Further, a part of the LUT 41 updated in the cache memory 551 is written back to the non-volatile memory 4 in the cache line unit.

It is assumed that the first LUT fragment table T411 is stored in the cache memory 551 for each cache line described above. Assuming that the first LUT fragment table T411 stored in the cache memory 551 is LUT cache data, the LUT cache data further includes pointers indicating LUT cache data to be associated with each other in, for example, the cache memory 551 in addition to the PBA storing unit 41*a*, the LBA storing unit 41*b*, and the management data storing unit 41*c* described above.

Specifically, the LUT cache data includes a prior pointer storing unit 41*d* that stores a pointer indicating LUT cache data referenced prior to the LUT cache data, and a next pointer storing unit 41*e* that stores a pointer indicating another LUT cache data referenced next to the LUT cache data.

As the pointers stored in the prior pointer storing unit 41*d* and the next pointer storing unit 41*e* described above, for example, a PBA in which other LUT cache data is stored is used, and an address in another format may be used.

By using the pointers to the LUT cache data before and after the LUT cache data should be referred to, the access to the cache memory 551 can be made speed up, and thereby continuous access can be realized. The LUT cache data may further include other management data.

Although the data structure of one first LUT fragment table T411 has been illustrated in FIG. 3, the plurality of first LUT fragment tables T411 included in the LUT 41 all have the same data structure.

Further, the data structures of the LUT fragment tables (the second LUT fragment table T412 to the fourth LUT fragment table T414) other than the first LUT fragment table T411 are the same as that of the first LUT fragment table T411. However, each of the PBA storing units 41*a* included in the second LUT fragment table T412 to the fourth LUT fragment table T414 stores the PBA (32 bits) in the non-volatile memory 4 in which the LUT fragment table is stored as a LUT pointer indicating the LUT fragment table corresponding to the lower hierarchy. In a case where the LUT fragment table corresponding to the lower hierarchy is stored in the cache memory 551, the address information of the cache memory 551 is stored in the PBA storing unit 41*a*.

Further, even with the PBA storing unit 41*a* included in the second LUT fragment table T412 to the fourth LUT fragment table T414, the first PBA in which data corresponding to the LBA ranges allocated to the PBA storing unit 41*a* (entry C412, C413, or C414) is written may be stored.

In the example illustrated in FIG. 3, the size of each of the first LUT fragment table T411 to the fourth LUT fragment table T414 is, for example, a fixed length of 168 bytes, and the size of each of the LUT cache data stored in the cache memory 551 is, for example, a fixed length of 188 bytes. In the present embodiment, it is assumed that the first LUT fragment table T411 to the fourth LUT fragment table T414 (that is, a plurality of LUT fragment tables included in the LUT 41) are configured to have the same data structure.

Here, it has been described that the LUT 41 has a hierarchical structure formed of a plurality of hierarchies; however, in the present embodiment, the VDM 42 also has a hierarchical structure similar to the LUT 41.

Hereinafter, the VDM 42 in the present embodiment will be described. First, VDM in a comparative example of the present embodiment will be described with reference to FIG. 4. It is assumed that the VDM in the comparative example of the present embodiment is configured to manage the validity of the data written to the physical address in the non-volatile memory 4 in a single hierarchy.

As illustrated in FIG. 4, VDM 42' in the comparative example of the present embodiment includes a plurality of VDM fragment tables T421' corresponding to a single hierarchy. The different PBA ranges (physical address) are allocated to each of the plurality of VDM fragment table T421', in each of the VDM fragment table T421', the validity (that is, whether the data is valid or invalid) of the data stored in the PBA ranges allocated to the VDM fragment table T421' is managed.

In this case, for example, the entire PBA ranges in the non-volatile memory 4 to which the data can be written based on the write command from the host 2 are divided into the number of VDM fragment tables T421', and the divided PBA range is allocated to each of the first VDM fragment tables T421'. With this, in the plurality of VDM fragment tables T421', it is possible to manage the validity of the data written in the entire range of PBAs in the non-volatile memory 4 that can write data based on the write command from the host 2. In each of the plurality of VDM fragment tables T421', the validity of the data written in the PBA ranges allocated to the VDM fragment table T421' is managed by using a bitmap (BMP) described later.

Here, for example, when the data is written to the PBA in the non-volatile memory 4 based on a write command from the host 2, in order to update the validity of the data written to the PBA, it is necessary to refer to the VDM fragment table T421' to which the PBA is allocated; however, in order to refer to the VDM fragment table T421', it is necessary to hold (expand) a pointer indicating each (position) of the plurality of VDM fragment tables T421' described above, on the memory 55. The pointer held on the memory 55 in this way includes, for example, the PBA in the non-volatile memory 4 in which each of the plurality of VDM fragment tables T421' is stored.

For example, assuming that the size of the memory region of the non-volatile memory 4 whose data validity is managed is 2 PiB, and the size of the data written to one PBA (that is, the unit of data whose validity is managed) is 4 KiB, 2 PiB/4 KiB=549,755,813,888, and it is necessary to manage the validity of 4 KiB data for about 512G in VDM 42'.

Further, assuming that one VDM fragment table T421' manages 4 KiB data for 1,280 pieces, for example, 512G/1,280=429,496,729.6, and the number of VDM fragment tables T421' required for VDM 42' is 429, 496, 730.

Further, assuming that the size of the pointer indicating each of the plurality of VDM fragment tables T421' is 32 bits (4 bytes), the total size of the pointers indicating all of the above 429,496,730 VDM fragment tables T421' is 429,496,730×4 Byte=1,717,986,920 Byte, which is approximately 1.6 GiB.

That is, when managing the validity of the data written in the PBA in the non-volatile memory 4 by using the VDM 42' corresponding to the comparative example of the present embodiment, since it is necessary to always hold the pointer indicating the above-mentioned 1.6 GiB of all VDM fragment tables T421' on the memory 55 (that is, the information required to manage VDM 42' will continue to occupy the memory 55), usability may be impaired. Specifically, it is useful to hold the LUT 41 in the memory 55 (cache memory 551) in order to improve the response speed (IO response speed) to the command from the host 2; however, it may not possible to secure sufficient memory regions to hold the LUT 41 by each pointer in the VDM fragment table T421' mentioned above.

In addition, the non-volatile memory 4 is formed of a plurality of chips, and for example, as the number of the chips or the capacity of the chips themselves is increased, the number of PBAs in the non-volatile memory 4 (that is, the memory region managed by the memory system 3) is increased.

According to this, since the number of the above-mentioned VDM fragment table T421' is also increased, the number of pointers indicating the VDM fragment table T421' is also increased, and a larger memory region needs to be secured in the memory 55 for the pointer.

Similarly, as the number of PBAs in the non-volatile memory 4 is increased, the size of the VDM 42' itself is also increased, and thus if necessary, the memory region for caching the VDM 42' has to be expanded.

For this, it is conceivable to secure a memory region by increasing memory (DRAM), for example, but it is necessary to avoid an increase in cost. That is, in the VDM 42' in the comparative example of the present embodiment, it is difficult to cope with the technological innovation (that is, the increase in the storage capacity) for the non-volatile memory 4.

Further, when starting the memory system 3, it is necessary to expand the pointers indicating all the VDM fragment table T421' on the memory 55 as described above.

Further, when the memory system 3 is terminated (stopped), it is necessary to make all the pointers held on the memory 55 non-volatile. Specifically, for example, when one VDM fragment table T421' is cached in the memory 55 (cache memory 551), the pointer indicating the VDM fragment table T421' held on the memory 55 is changed to the address information in the cache memory 551. When terminating the memory system 3, such a VDM fragment table T421' is written back to the non-volatile memory 4 (that is, made non-volatile). In this case, it is necessary to change the pointer indicating the VDM fragment table T421' (address information in the cache memory 551) to the PBA in the non-volatile memory 4 in which the VDM fragment table T421' is written, and to write the PBA (that is, the pointer) in the changed non-volatile memory 4 to the non-volatile memory 4. In a case where the memory system 3 is terminated, such processing is executed for all VDM fragment table T421' cached in the cache memory 551.

That is, in the VDM 42' in the comparative example of the present embodiment, it takes time for the internal process (starting process and terminating process) when starting and terminating the memory system 3.

Therefore, in the present embodiment, by employing the VDM 42 having a hierarchical structure as in the above-mentioned LUT 41, it is possible to efficiently manage the validity of the data written in the non-volatile memory 4.

Specifically, the VDM 42 in the present embodiment has a hierarchical structure formed of a plurality of hierarchies and is configured to include a plurality of VDM fragment tables for the plurality of hierarchies.

In such a VDM 42, it is assumed that each of the plurality of VDM fragment tables has the same size, for example. Further, as will be described in detail later, in the VDM fragment table corresponding to the upper hierarchy among the plurality of VDM fragment tables corresponding to the plurality of hierarchies, (the range of) PBAs, reference destination information (hereinafter, referred to as a VDM pointer) for referencing the VDM fragment table corresponding to the hierarchy lower than the VDM fragment table, and the like are stored. The VDM pointer includes, for example, the PBA in the non-volatile memory 4 in which the VDM fragment table to be a reference destination is stored. Further, the VDM fragment table corresponding to the lowest hierarchy in the hierarchical structure of the VDM 42 manages the validity of each data having a predetermined size (for example, 4 KiB data) stored in the PBA ranges allocated to the VDM fragment table.

Hereinafter, the VDM 42 having a hierarchical structure in the present embodiment will be conceptually described with reference to FIG. 5. In the example illustrated in FIG. 5, for convenience, it is assumed that the VDM 42 has a hierarchical structure formed of four hierarchies. In this case, the VDM 42 includes a plurality of first VDM fragment tables T421 to fourth VDM fragment tables T424.

As illustrated in FIG. 5, the first VDM fragment table T421 is a VDM fragment table corresponding to the lowest hierarchy (hereinafter, referred to as a first hierarchy) in the hierarchical structure of the VDM 42. The second VDM fragment table T422 is a VDM fragment table corresponding to the higher hierarchy (hereinafter, referred to as a second hierarchy) of the first VDM fragment table T421 in the hierarchical structure of the VDM 42. The third VDM fragment table T423 is a VDM fragment table corresponding to the higher hierarchy (hereinafter referred to as a third hierarchy) of the second VDM fragment table T422 in the hierarchical structure of the VDM 42. The fourth VDM fragment table T424 is a VDM fragment table corresponding to the higher hierarchy (hereinafter, referred to as a fourth hierarchy) of the third VDM fragment table T423 in the hierarchical structure of the VDM 42. In the example illustrated in FIG. 5, the fourth hierarchy is the highest hierarchy in the hierarchical structure of the VDM 42, and in the VDM 42, the number of VDM fragment tables (that is, the fourth VDM fragment table T424) corresponding to the highest hierarchy is, for example, 1. In the present embodiment, the number of the fourth VDM fragment tables T424 (VDM fragment table corresponding to the highest hierarchy) is assumed to be 1; however, the number of the fourth VDM fragment table T424 may be plural.

Hereinafter, each of the above-mentioned first VDM fragment table T421 to fourth VDM fragment table T424 will be described in detail.

First, consecutive PBA ranges are allocated to each of the plurality of first VDM fragment tables T421, and the first VDM fragment table T421 includes a plurality of entries C421. In addition, each of the plurality of entries C421 included in the first VDM fragment table T421 stores a bitmap (BMP) formed of 1-bit of bit information that manages the validity of the data stored in each of the plurality of PBAs corresponding to the PBA ranges assigned to the first VDM fragment table T421. In such a bitmap, for each PBA, for example, when the bit information is 1, it can indicate that the data stored in the PBA is valid, and when the bit information is 0, it can indicate that the data stored in the PBA is invalid.

The plurality of first VDM fragment tables T421 correspond to the plurality of VDM fragment tables T421' illustrated in FIG. 4 described above, and the entire PBA ranges in the non-volatile memory 4 to which the data can be written based on the write command from the host 2 are divided into the number of VDM fragment tables T421, and the divided PBA range is allocated to each of the first VDM fragment tables T421. With this, in the plurality of VDM fragment tables T421, it is possible to manage the validity of the data written in the entire range of PBAs in the non-volatile memory 4 that can write data based on the write command from the host 2.

Next, wider PBA ranges than those of the first VDM fragment table T421 described above are allocated to each of the plurality of second VDM fragment tables T422, and the second VDM fragment tables T422 includes a plurality of entries C422. Further, for each of the plurality of entries C422 included in the second VDM fragment tables T422, the PBA ranges allocated to the first VDM fragment tables T421 corresponding to the lower hierarchy of the second VDM fragment tables T422 are allocated, and the VDM pointer indicating (position) of the first VDM fragment table T421 is stored. In this case, the PBA ranges allocated to each of the second VDM fragment table T422 correspond to the PBA ranges allocated to all the first VDM fragment tables T421 indicated by the VDM pointer stored in each of the plurality of entries C422 included in the second VDM fragment table T422.

Further, wider PBA ranges than those of the second VDM fragment table T422 described above are allocated to each of the plurality of third VDM fragment tables T423, and the third VDM fragment tables T423 includes a plurality of entries C423. Further, for each of the plurality of entries C423 included in the third VDM fragment tables T423, the PBA ranges allocated to the second VDM fragment tables T422 corresponding to the lower hierarchy of the third VDM fragment tables T423 are allocated, and the VDM pointer indicating (position) of the second VDM fragment table T422 is stored. In this case, the PBA ranges allocated to each of the third VDM fragment table T423 correspond to the PBA ranges allocated to all the second VDM fragment tables T422 indicated by the VDM pointer stored in each of the plurality of entries C423 included in the third VDM fragment table T423.

Next, wider PBA ranges than those of the third VDM fragment table T423 described above are allocated to the fourth VDM fragment table T424, and the fourth VDM fragment table T424 includes a plurality of entries C424. Further, for each of the plurality of entries C424 included in the fourth VDM fragment tables T424, the PBA ranges allocated to the third VDM fragment tables T423 corresponding to the lower hierarchy of the fourth VDM fragment tables T424 are allocated, and the VDM pointer indicating (position) of the third VDM fragment table T423 is stored. In this case, the LBA ranges allocated to each of the fourth VDM fragment table T424 correspond to the PBA ranges allocated to all the third VDM fragment tables T423 indicated by the VDM pointer stored in each of the plurality of entries C424 included in the fourth VDM fragment table T424.

As described above, when the number of the fourth VDM fragment table T424 corresponding to the highest hierarchy in the hierarchical structure of the VDM 42 is 1, the PBA ranges allocated to the fourth VDM fragment table T424 covers the entire PBA ranges in the non-volatile memory 4 in which the validity of data is managed.

In the VDM 42 having the hierarchical structure illustrated in FIG. 5 described above, the VDM pointer stored in each of the entries C424 included in the fourth VDM fragment table T424 corresponding to the fourth hierarchy (the highest hierarchy) indicates the third VDM fragment table T423 corresponding to the third hierarchy, the VDM pointer stored in each of the entries C423 included in the third VDM fragment table T423 indicates the second VDM fragment table T422 corresponding to the second hierarchy, the VDM pointer stored in each of the entries C422 included in the second VDM fragment table T422 indicates the first VDM fragment table T421 corresponding to the first hierarchy (the lowest hierarchy), and each of the entries C421 included in the first VDM fragment table T421 is configured to store flag information (bitmap) indicating the validity of each data having a predetermined size stored in a plurality of PBAs.

According to such a VDM 42, for example, the validity of the data can be grasped by sequentially referring to the fourth VDM fragment table T424, the third VDM fragment table T423, the second VDM fragment table T422, and the first VDM fragment table T421 based on the PBA in which the data to be confirmed for validity is stored.

That is, in the VDM 42 illustrated in FIG. 5, since the validity of the data stored in all PBAs from the fourth VDM fragment table T424 corresponding to the fourth hierarchy (that is, the validity of the data managed in the first VDM fragment table) can be grasped, unlike the VDM 42' in the comparative example of the present embodiment described with reference to FIG. 4 described above, the memory 55 only needs to hold the VDM pointer (that is, one pointer) indicating the fourth VDM fragment table T424.

Here, in the example illustrated in FIG. 5, the first VDM fragment table T421 is a VDM fragment table corresponding to the lowest hierarchy in the hierarchical structure of the VDM 42, and the flag information (bitmap) indicating the validity of each data having a predetermined size stored in a continuous PBA range is stored in each of the entries C421 included in the first VDM fragment table T421. In this case, one first VDM fragment table T421 includes 32 entries C421, and assuming that one entry C421 includes a 32-bit bitmap indicating the validity of 32 pieces of data, 32×32=1,024 PBA ranges are allocated to one first VDM fragment table T421 corresponding to the first hierarchy. In this case, assuming that the size of the data written to one PBA is 4 KiB as described above, the validity of the data of 4 KiB×1,024=4 MiB can be managed in one first VDM fragment table T421.

Similarly, assuming that the second VDM fragment table T422 includes 32 entries C422, and the VDM pointer indicating the first VDM fragment table T421 with 1,024 PBAs that store 4 MiB data is stored in each of the entries C422 (that is, 1,024 PBA ranges allocated to the first VDM fragment table T421 are allocated to each of the entries C422), 1,024×32=32,768 PBA ranges are allocated to the second VDM fragment table T422 corresponding to the second hierarchy. In this case, the validity of the data of 4 KiB×32,768=128 MiB can be managed in one second VDM fragment table T422.

Further, assuming that the third VDM fragment table T423 includes 32 entries C423, and the pointer indicating the second VDM fragment table T422 with 32,768 PBAs that store 128 MiB data is stored in each of the entries C423 (that is, 32,768 PBA ranges allocated to the second VDM fragment table T422 are allocated to each of the entries C423), 32,768×32=1,048,576 PBA ranges are allocated to one third VDM fragment table T423 corresponding to the third hierarchy. In this case, the validity of the data of 4 KiB×1,048,576=4 GiB can be managed in one third VDM fragment table T423.

Further, assuming that the fourth VDM fragment table T424 includes 32 entries C414, and the pointer indicating the third VDM fragment table T423 with 1,048,576 PBAs that store 4 GiB data is stored in each of the entries C424 (that is, 1,048,576 PBA ranges allocated to the third VDM fragment table T423 are allocated to each of the entries C424), 1,048,576×32=33,554,432 PBA ranges are allocated to one fourth VDM fragment table T424 corresponding to the fourth hierarchy. In this case, the validity of the data of 4 KiB×33,554,432=128 GiB can be managed in one fourth VDM fragment table T424.

That is, in the example of VDM 42 illustrated in FIG. 5, each of the first VDM fragment table T421 manages the PBA ranges in which 4 MiB data is stored, each of the second VDM fragment table T422 manages the PBA ranges where 128 MiB data is stored, each of the third VDM fragment table T423 manages the PBA ranges in which 4 GiB data is stored, and the fourth VDM fragment table T424 manages the PBA ranges where 128 GiB data is stored.

In FIG. 5, an example in which the VDM pointer is stored in each of the plurality of entries C424 included in the fourth VDM fragment table T424 is illustrated; however, in a case where the plurality of third VDM fragment tables T423 indicated by each of the VDM pointers are continuously arranged in the non-volatile memory 4, the fourth VDM fragment table T424 may be configured to store only a VDM pointer indicating the first third VDM fragment table T423 of the plurality of the third VDM fragment tables T423 (that is, configured to omit the VDM pointer indicating the third VDM fragment table T423 that is not the first). According to this, it is possible to reduce the size of the VDM 42. Here, the fourth VDM fragment table T424 has been described, but the same applies to other VDM fragment tables.

Further, for example, when the validity (valid or invalid) of each of the 4 KiB data written in the PBA ranges allocated to one VDM fragment table is common, it is also possible to collectively manage the validity of the data written in the PBA ranges in the VDM fragment table, and omit the VDM fragment table corresponding to the hierarchy lower than the VDM fragment table (that is, indicated by the VDM pointer stored in the entry included in the VDM fragment table).

Specifically, for example, it is assumed that the second VDM fragment table T422 manages the PBA ranges in which 128 MiB data is stored, and (all 4 KiB data that includes) the 128 MiB data is all valid or all invalid. In this case, by holding the management data indicating that all 128 MiB data stored in the PBA ranges allocated to the second VDM fragment table T422 is valid or invalid in the third VDM fragment table T423 (that is, including an entry that stores a VDM pointer indicating the second VDM fragment table T422) corresponding to the higher hierarchy of the second VDM fragment table T422, each of the second VDM fragment table T422 and the first VDM fragment table T421 corresponding to the lower hierarchy of the second VDM fragment table T422 may be discarded. According to this, since it is not necessary to refer to the second VDM fragment table T422 and the first VDM fragment table T421 lower than the third VDM fragment table T423, the access speed for the data written in the VDM 42 can be improved.

FIG. 6 illustrates an example of the data structure of the first VDM fragment table T421 included in the VDM 42 in the present embodiment.

The first VDM fragment table T421 includes, for example, a plurality of map storing units 42*a*, PBA storing units 42*b*, and management data storing units 42*c*.

The map storing unit 42*a* corresponds to the entry C421 included in the first VDM fragment table T421 illustrated in FIG. 5. That is, the number of map storing units 42*a* is, for example, 32. The map storing unit 42*a* stores the bitmap to be formed of 1-bit flag information that manages the validity (validity or invalidity) of each of the 4 KiB data written in the PBA ranges allocated to the map storing unit 42*a* (entry C421). When 32 PBA ranges are allocated to the map storing unit 42*a*, the size of the bitmap stored in the map storing unit 42*a* is 1 bit×32=32 bits.

Further, for example, 8-bit management data MD2 is attached to the bitmap stored in the map storing unit 42*a*, and the management data MD2 is stored in the map storing unit 42*a* together with the bitmap. As the management data MD2 attached to the bitmap in this way, for example, a magic number called VDM mode is set. The magic number set as the management data MD2 includes "0xff" and "0x00".

As described above, although the bitmap stored in the map storing unit 42*a* is formed of 1-bit flag information indicating validity of 4 KiB data stored in each of the 32 PBAs allocated to the map storing unit 42*a*, in the following description, the 4 KiB data stored in each of the 32 PBAs will be referred to as the data managed in the bitmap for convenience.

The magic number "0xff" indicates that all the data managed in the bitmap to which the magic number (management data MD2) is attached is valid (that is, all the flag information that makes up the bitmap is 1). That is, according to this magic number "0xff", it is possible to collectively manage the validity of data written in a certain PBA range, and also possible to grasp that all the data managed in the bitmap is valid without referring to the bitmap to which the magic number is attached.

The magic number "0x00" indicates that all the data managed in the bitmap to which the magic number (management data MD2) is attached is invalid (that is, all the flag information that makes up the bitmap is 0). That is, according to this magic number "0x00", similar to the magic number "0xff" mentioned above, it is possible to collectively manage the validity of data written in a certain PBA range, and also possible to grasp that all the data managed in the bitmap is invalid without referring to the bitmap to which the magic number is attached.

In a case where the magic number "0xff" and "0x00" are not set as the management data MD2, it means that the bitmap to which the management data MD2 is attached is formed of flag information indicating validity and flag information indicating invalidity (that is, the flag information indicating validity and the flag information indicating invalidity are mixed in the bitmap).

When the bitmap and the management data MD2 are stored in the map storing unit 42*a* as described above, each size of the map storing unit 42*a* is 40 bits, which is the sum of the size (32 bits) of the bitmap and the size (8 bits) of the management data MD2, and the total size of the 32 map storing units 42*a* is 160 bytes.

The PBA storing unit 42*b* stores the first PBA in the PBA ranges allocated to the first VDM fragment table T421.

The management data storing unit 42*c* stores Valid ADU Count indicating the number of valid data among the plurality of 4 KiB data stored in the PBA ranges allocated to the first VDM fragment table T421 and Grain corresponding to the PBA ranges (PBA ranges managed by the first VDM fragment table T421) allocated to the first VDM fragment table T421. For the first VDM fragment table T421, the maximum value of Valid ADU Count is 1,024.

In addition, other information may be stored in the management data storing unit 42*c*. Specifically, the management data storing unit 42*c* may store identification information (hierarchy ID) or the like for identifying the hierarchy (first hierarchy) corresponding to the first VDM fragment table T421.

Here, for example, when the VDM 42 is updated in the present embodiment, a part of the VDM 42 (VDM fragment table to be updated) is stored in the cache memory 551. In this case, a part of the VDM 42 is stored in a cache line unit. Further, a part of the VDM 42 updated in the cache memory 551 is written back to the non-volatile memory 4 in the cache line unit.

It is assumed that the first VDM fragment table T421 is stored in the cache memory 551 for each cache line described above. Assuming that the first VDM fragment table T421 stored in the cache memory 551 is VDM cache data, the VDM cache data further includes pointers indicating VDM cache data to be associated with each other in, for example, the cache memory 551 in addition to the map storing unit 42*a*, the PBA storing unit 42*b*, and the management data storing unit 42*c* described above.

Specifically, the VDM cache data includes a prior pointer storing unit 42*d* that stores a pointer indicating VDM cache data referenced prior to the VDM cache data, and a next pointer storing unit 42*e* that stores a pointer indicating another VDM cache data referenced next to the VDM cache data. The prior pointer storing unit 42*d* and the next pointer storing unit 42*e* may store the pointers indicating the above-mentioned LUT cache data.

As the pointers stored in the prior pointer storing unit 42*d* and the next pointer storing unit 42*e* described above, for example, a PBA in which other VDM cache data is stored is used, and an address in another format may be used.

By using the pointers to the VDM cache data before and after the VDM cache data should be referred to, the access to the cache memory 551 can be made speed up, and thereby continuous access can be realized. The VDM cache data may further include other management data.

Although the data structure of one first VDM fragment table T421 has been illustrated in FIG. 6, the plurality of first VDM fragment tables T421 included in the VDM 42 all have the same data structure.

Next, FIG. 7 illustrates an example of the data structure of the second VDM fragment table T422 included in the VDM 42 in the present embodiment. Here, the differences from the first VDM fragment table T421 illustrated in FIG. 6 described above will be mainly described.

In FIG. 6, the first VDM fragment table T421 has been described as including the map storing unit 42*a*; however, the second VDM fragment table T422 includes a PBA storing unit 42*f* instead of the map storing unit 42*a*.

The PBA storing unit 42*f* corresponds to the entry C422 included in the second VDM fragment table T422 illustrated in FIG. 5. That is, the number of PBA storing units 42*f* is, for example, 32. The PBA storing unit 42*f* stores the PBA in the non-volatile memory 4 in which the first VDM fragment table T421 is stored as a pointer indicating the first VDM fragment table T421 corresponding to the lower hierarchy of the second VDM fragment table T422. In a case where the first VDM fragment table T421 corresponding to the lower hierarchy is stored in the cache memory 551, the address information of the cache memory 551 is stored in the PBA storing unit 42*f*. The size of the PBA stored in the PBA storing unit 42*f* is, for example, 32 bits.

Further, for example, 8-bit management data MD3 is attached to the PBA stored in the PBA storing unit 42*f*, and the management data MD3 is stored in the PBA storing unit 42*f* together with the bitmap. As the management data MD3 attached to the bitmap in this way, a magic number called VDM mode is set as in the management data MD2 illustrated in FIG. 6 described above.

In addition, although it has been described that "0xff" and "0x00" are set as the magic numbers for the management data MD2, the magic numbers set as the management data MD3 further include "0xfc" and "0xfd" in addition to the "0xff" and "0x00".

The magic number "0xfc" indicates that the PBA to which the magic number (management data MD3) is attached is the PBA in the non-volatile memory 4. According to this magic number "0xfc", it is possible to refer to (acquire) the first VDM fragment table T421 stored in the non-volatile memory 4 based on the PBA to which the magic number is attached.

The magic number "0xfd" indicates that the PBA to which the magic number (management data MD3) is attached is the address information in the cache memory 551. According to this magic number "0xfd", it is possible to refer to (acquire) the first VDM fragment table T421 stored in the cache memory 551 based on the PBA to which the magic number is attached.

As described above, the first VDM fragment table T421 referenced based on the PBA stored in the PBA storing unit 42*f* is a VDM fragment table corresponding to the first hierarchy to which the PBA ranges allocated to the PBA storing unit 42*f* (entry C422) is allocated.

Further, the above-mentioned magic number "0xff" or "0x00" may be set as the management data MD3. When the magic number "0xff" is set as the management data MD3, it means that all 4 KiB data stored in the PBA ranges (for example, 1,024 PBAs) allocated to the PBA storing unit 42*f* that stores the PBAs with the magic number is valid. On the other hand, when the magic number "0x00" is set as the management data MD3, it means that all 4 KiB data stored in the PBA ranges (for example, 1,024 PBAs) allocated to the PBA storing unit 42*f* that stores the PBAs with the magic number is invalid.

That is, when one of the magic numbers "0xff" and "0x00" is set as the management data MD3, it is possible to grasp that all the data stored in the PBA ranges allocated to the PBA storing unit 42*f* (entry C422) that stores the PBA with the magic number is valid or invalid. In this case, it is not necessary to refer to the first VDM fragment table T421 corresponding to the lower hierarchy based on the PBA with the magic number "0xff" or "0x00".

On the other hand, when the magic numbers "0xff" and "0x00" are not set as the management data MD3 (that is, the magic numbers "0xfc" or "0xfd" are set), it is possible to grasp that valid data and invalid data are mixed in the PBA ranges allocated to the PBA storing unit 42*f* (entry C422) that stores the PBA to which the magic number is attached. In this case, it is necessary to refer to the first VDM fragment table T421 corresponding to the lower hierarchy based on the PBA with the magic number "0xfc" or "0xfd".

When the PBA and the management data MD3 are stored in the PBA storing unit 42*f* as described above, each size of the PBA storing unit 42*f* is 40 bits, which is the sum of the size (32 bits) of the PBA and the size (8 bits) of the management data MD3, and the total size of the 32 PBA storing units 42*f* is 160 bytes.

The second VDM fragment table T422 further includes the PBA storing unit 42*b* and the management data storing unit 42*c* in addition to the PBA storing unit 42*f*, and the PBA storing unit 42*b* and the management data storing unit 42*c* are as illustrated in FIG. 6. Therefore, the detailed description thereof will be omitted here.

In addition, the second VDM fragment table T422 (VDM cache data) stored in the cache memory 551 includes the prior pointer storing unit 42*d* and the next pointer storing unit 42*e*, and since the prior pointer storing unit 42*d* and the next pointer storing unit 42*e* are also as illustrated in FIG. 6, a detailed description thereof will be omitted here.

Although the data structure of one second VDM fragment table T422 has been illustrated in FIG. 7, the plurality of second VDM fragment tables T422 included in the VDM 42 all have the same data structure.

Further, the data structures of the VDM fragment tables (the third VDM fragment table T423 to the fourth VDM fragment table T424) other than the second VDM fragment table T422 are the same as that of the second VDM fragment table T422. That is, for example, even in the third VDM fragment table T423, if one of the magic numbers "0xff" and "0x00" is set as the management data MD3, it is not necessary to refer to the second VDM fragment table T422 corresponding to the lower hierarchy based on the PBA with the magic number. The same applies to the fourth VDM fragment table T424.

In the examples illustrated in FIGS. 6 and 7 described above, the size of each of the first VDM fragment table T421 to the fourth VDM fragment table T424 is, for example, a fixed length of 168 bytes, and the size of each of the VDM cache data stored in the cache memory 551 is, for example, a fixed length of 188 bytes. In the present embodiment, it is assumed that the first VDM fragment table T421 to the fourth VDM fragment table T424 (that is, a plurality of VDM fragment tables included in the VDM 42) are configured to have the same data structure.

Further, as illustrated in FIGS. 3, 6, and 7 described above, (each LUT fragment table included in) the LUT 41 and (each VDM fragment table included in) the VDM 42 in the present embodiment have the same data structure. Hereinafter, the relationship between the above-mentioned LUT 41 and VDM 42 will be described.

First, assuming that LUT 41 is the data for managing PBA corresponding to LBA as described above, and one first LUT fragment table T411 corresponding to the lowest hierarchy (first hierarchy) includes 32 entries C411 (PBA storing unit 41*a*), in the first LUT fragment table T411, 32 LBAs (corresponding PBAs) can be managed. Also, assuming that one second LUT fragment table T412 corresponding to the second lowest hierarchy (second hierarchy) also includes 32 entries C412, in the second LUT fragment table T412, 32×32=1,024 LBAs (corresponding PBAs) can be managed. Here, the second hierarchy has been described, but the same applies to the hierarchies higher than the second hierarchy.

On the other hand, assuming that VDM 42 is the data for managing the validity of the data stored in each PBA as described above, and a 32-bit bitmap is stored in one entry C421 (map storing unit 42*a*) of one first VDM fragment table T421 corresponding to the lowest hierarchy (first hierarchy), in the first VDM fragment table T421, 32 bits× 32=1,024 PBAs (data stored in) can be managed. Also, assuming that one second VDM fragment table T422 corresponding to the second lowest hierarchy (second hierarchy) also includes 32 entries C422, in the second VDM fragment table T422, (data stored in) 1,024×32=32,768 PBAs can be managed. Here, the second hierarchy has been described, but the same applies to the hierarchies higher than the second hierarchy.

That is, in the present embodiment, each of the LUT 41 and the VDM 42 manages one fragment table corresponding to the lower hierarchy with one entry, and in both the LUT 41 and the VDM 42, it is possible to manage 32 times as many PBAs each time the hierarchy goes up one level.

Here, it is assumed that 4 MiB data corresponding to 1,024 consecutive LBA ranges is written (sequentially written) to 1,024 consecutive PBAs in the non-volatile memory 4. Then, it is assumed that 4 KiB data is written in each of the 1,024 PBAs.

In this case, it is necessary to manage the correspondence between the LBA corresponding to the 4 MiB data written in the non-volatile memory 4 and the PBA in which the data is written in the LUT 41, and as described above, the second LUT fragment table T412 can manage (PBAs corresponding to) 1,024 LBAs.

Therefore, in a case where 1,024 LBAs managed (that is, allocated to the second LUT fragment table T412) by the second LUT fragment table T412 match the 1024 LBAs corresponding to the 4 MiB data described above, among the LUT pointers stored in the plurality of entries C413 included in the third LUT fragment table T413 corresponding to the higher hierarchy of the second LUT fragment table T412, the LUT pointer indicating the second LUT fragment table T412 can be updated to the first PBA of the 1024 PBAs in which the data of the 4 MiB is written. According to this, one entry C413 included in the third LUT fragment table T413 can manage the correspondence between the LBA corresponding to the above-mentioned 4 MiB data and the PBA in which the data is written.

On the other hand, in a case where 4 MiB data is written to 1,024 consecutive PBAs in the non-volatile memory 4 as described above, it is necessary to manage the 4 MiB data as valid data in VDM 42, and the first VDM fragment table T421 can manage 1,024 PBAs.

Therefore, in a case where 1,024 PBAs managed (that is, allocated to the first VDM fragment table T421) by the first VDM fragment table T421 match the 1,024 PBAs corresponding to the 4 MiB data described above, among the VDM pointers stored in the plurality of entries C422 included in the second VDM fragment table T422 corresponding to the higher hierarchy of the first VDM fragment table T421, the management data MD3 (magic number) attached to the VDM pointer indicating the first VDM fragment table T421 can be updated to "0xff". According to this, one entry C422 included in the second VDM fragment table T422 can manage that the 4 MiB data stored in the above 1,024 PBAs is valid.

That is, when 4 MiB data corresponding to 1,024 consecutive LBA ranges is written to 1,024 consecutive PBAs as described above, the correspondence between the LBA and the PBA can be managed by changing one entry (PBA) included in the LUT fragment table corresponding to the third lowest hierarchy included in the LUT 41. In addition, the validity of the 4 MiB data written to the non-volatile memory 4 in this way can be managed by changing one entry (magic number) included in the VDM fragment table corresponding to the second lowest hierarchy included in VDM 42.

Thus, in the present embodiment, by making each fragment table included in LUT 41 and VDM 42 the same data structure and aligning the management units in the LUT 41 and VDM 42, the update of LUT 41 and VDM 42 can be completed only by changing the entry contained in the fragment table of the higher hierarchy without updating the fragment table corresponding to the lowest hierarchy.

Here, in order to complete the update of the LUT 41 and VDM 42 by changing the entries included in the fragment table corresponding to the higher hierarchy as described above, the VDM fragment table included in the VDM 42 which has the same data structure as the LUT fragment table contained in LUT 41 is required to satisfy $M = y \times N^x$ (hereinafter, referred to as conditional expression).

In the above conditional expression, N is the number of entries included in the first VDM fragment table T421 corresponding to the lowest hierarchy, and M is the number of 4 KiB data (that is, the PBA where the data is stored) whose validity is managed in one entry included in the first VDM fragment table T421 corresponding to the lowest hierarchy. In the conditional expression, x is an integer of 0 or more, and y is an integer of 1 or more and less than N or the reciprocal of an integer of 1 or more and less than N.

Hereinafter, the relationship between N and M described above will be specifically described. Here, the number of (PBAs corresponding to) LBAs allocated to each LUT fragment table is referred to as the number of PBAs managed by the LUT fragment table and the number of PBAs allocated to each VDM fragment table is referred to as the number of PBAs managed by the VDM fragment table.

The number of (PBAs corresponding to) LBAs allocated to one entry included in the LUT fragment table (first LUT fragment table T411) corresponding to the first hierarchy (the lowest hierarchy) is 1, and the same applies to the following description.

FIG. 8 illustrates a relationship between the number of PBAs managed by the LUT fragment table and the number of PBAs managed by the VDM fragment table corresponding to each hierarchy when N=32 and M=32.

Here, when N=32 and M=32, the number of PBAs managed by the LUT fragment table corresponding to the first hierarchy is 32, and the number of PBAs managed by the VDM fragment table (first VDM fragment table T421) corresponding to the first hierarchy is 1,024. In addition, the number of PBAs managed by the LUT fragment table (second LUT fragment table T412) corresponding to the second hierarchy is 1,024, and the number of PBAs managed by the VDM fragment table (second VDM fragment table T422) corresponding to the second hierarchy is 32,768.

Although detailed description of the number of PBAs managed by the LUT fragment table and the number of PBAs managed by the VDM fragment table corresponding to the hierarchy higher than the second hierarchy will be omitted, when N=32, both the number of PBAs managed by the LUT fragment table and the number of PBAs managed by the VDM fragment table are 32 times higher when the hierarchy is one level higher.

Comparing the LUT fragment table and the VDM fragment table corresponding to the same hierarchy as described above, the number of PBAs managed by the VDM fragment table is larger than the number managed by the LUT fragment table. Further, when the number of PBAs managed as a whole LUT 41 and the number of PBAs managed as a whole VDM 42 are the same, the number of hierarchies constituting the hierarchical structure of the VDM 42 in the present embodiment is smaller than the number of hierarchies constituting the hierarchical structure of the LUT 41.

When N=32 and M=32, the above conditional expression is satisfied when x=1 and y=1. When the conditional expression is satisfied in this way, x corresponds to the hierarchical difference between the LUT fragment table and the VDM fragment table, and y corresponds to a ratio of the number of PBAs managed by the LUT fragment table to the number of PBAs managed by the VDM fragment table (that is, "number of PBAs managed by VDM fragment table/number of PBAs managed by LUT fragment table"). Specifically, when focusing on the LUT fragment table corresponding to the second hierarchy and the VDM fragment table corresponding to the first hierarchy, where the difference between the hierarchies is 1 (that is, x=1), the number of PBAs managed by the LUT fragment table is 1,024, the number of PBAs managed by the VDM fragment table is 1,024, and "number of PBAs managed by VDM fragment table/number of PBAs managed by LUT fragment table" is 1 (that is, y=1).

If N and M satisfy the above conditional expression in this way, for example, when the data corresponding to the 1,024 LBA ranges allocated to the LUT fragment table corresponding to the second hierarchy is written to the non-volatile memory 4, the update of the LUT 41 can be completed by changing one entry (PBAs stored in PBA storing unit 41a) included in the LUT fragment table corresponding to the third hierarchy. Similarly, when the data corresponding to the 1,024 LBA ranges is written to the 1,024 PBAs allocated to the VDM fragment table corresponding to the first hierarchy, the update of the VDM 42 can be completed by changing one entry (magic number stored in map storing unit 42a) included in the VDM fragment table corresponding to the second hierarchy.

That is, when N=32 and M=32, the ratio of the number of PBAs managed by the LUT fragment table corresponding to i (i is an integer of 1 or more) hierarchy to the number of PBAs managed by the VDM fragment table corresponding to i−1 hierarchy is 1:1, and for example, if the continuity of the LBA and PBA is secured, a change of one entry in the LUT fragment table can correspond to the update of the LUT 41, and a change of one entry of the VDM 42 can correspond to the update of the VDM 42.

Note that, N=32 and M=32 illustrated in FIG. 8 are one of the examples in which the LUT 41 (correspondence between LBA and PBA) and the VDM 42 (data validity) can be managed most efficiently. For example, even when N is changed, efficient management of the LUT 41 and the VDM 42 can be realized as long as the above conditional expression is satisfied.

Hereinafter, the case where N is changed will be described, but detailed description thereof will be omitted for the same parts as those illustrated in FIG. 8 described above.

FIG. 9 illustrates a relationship between the number of PBAs managed by the LUT fragment table and the number of PBAs managed by the VDM fragment table corresponding to each hierarchy when N=8 and M=32.

Here, when N=8 and M=32, the number of PBAs managed by the LUT fragment table corresponding to the first hierarchy is 8, and the number of PBAs managed by the VDM fragment table corresponding to the first hierarchy is 256. Further, the number of PBAs managed by the LUT fragment table corresponding to the second hierarchy is 64, and the number of PBAs managed by the VDM fragment table corresponding to the second hierarchy is 2,048.

Although detailed description of the number of PBAs managed by the LUT fragment table and the number of PBAs managed by the VDM fragment table corresponding to the hierarchy higher than the second hierarchy will be omitted, when N=8, both the number of PBAs managed by the LUT fragment table and the number of PBAs managed by the VDM fragment table are 8 times higher when the hierarchy is one level higher.

In addition, when N=8 and M=32, the above conditional expression is satisfied when x=1 and y=4. Specifically, when focusing on the LUT fragment table corresponding to the second hierarchy and the VDM fragment table corresponding to the first hierarchy, where the difference between the hierarchies is 1 (that is, x=1), the number of PBAs managed by the LUT fragment table is 64, the number of PBAs managed by the VDM fragment table is 256, and "number of PBAs managed by VDM fragment table/number of PBAs managed by LUT fragment table" is 4 (that is, y=4).

If N and M satisfy the above conditional expression in this way, for example, when the data corresponding to the 256 LBA ranges allocated to four LUT fragment tables corresponding to the second hierarchy is written to the non-volatile memory 4, the update of the LUT 41 can be completed by changing four entries included in the LUT fragment table corresponding to the third hierarchy. Similarly, when the data corresponding to the 256 LBA ranges is written to the 256 PBAs allocated to the VDM fragment table corresponding to the first hierarchy, the update of the VDM 42 can be completed by changing one entry included in the VDM fragment table corresponding to the second hierarchy.

That is, when N=8 and M=32, the ratio of the number of PBAs managed by the LUT fragment table corresponding to i hierarchy to the number of PBAs managed by the VDM fragment table corresponding to i−1 hierarchy is 1:4, and as described above, if the continuity of the LBA and PBA is secured, a change of four entries in the LUT fragment table can correspond to the update of the LUT 41, and a change of one entry of the VDM 42 can correspond to the update of the VDM 42.

When N=8 and M=32, the above conditional expression is satisfied when x=2 and y=½. Although detailed description will be omitted, in this case, the ratio of the number of PBAs managed by the LUT fragment table corresponding to i hierarchy to the number of PBAs managed by the VDM fragment table corresponding to i−2 hierarchy is 2:1, and as described above, if the continuity of the LBA and PBA is secured, a change of one entry in the LUT fragment table can correspond to the update of the LUT 41, and a change of two entries of the VDM fragment table can correspond to the update of the VDM 42.

FIG. 10 illustrates a relationship between the number of PBAs managed by the LUT fragment table and the number of PBAs managed by the VDM fragment table corresponding to each hierarchy when N=16 and M=32.

Here, when N=16 and M=32, the number of PBAs managed by the LUT fragment table corresponding to the first hierarchy is 16, and the number of PBAs managed by the VDM fragment table corresponding to the first hierarchy is 512. Further, the number of PBAs managed by the LUT fragment table corresponding to the second hierarchy is 256, and the number of PBAs managed by the VDM fragment table corresponding to the second hierarchy is 8,192.

Although detailed description of the number of PBAs managed by the LUT fragment table and the number of PBAs managed by the VDM fragment table corresponding to the hierarchy higher than the second hierarchy will be omitted, when N=16, both the number of PBAs managed by the LUT fragment table and the number of PBAs managed by the VDM fragment table are 16 times higher when the hierarchy is one level higher.

In addition, when N=16 and M=32, the above conditional expression is satisfied when x=1 and y=2. Specifically, when focusing on the LUT fragment table corresponding to the second hierarchy and the VDM fragment table corresponding to the first hierarchy, where the difference between the hierarchies is 1 (that is, x=1), the number of PBAs managed by the LUT fragment table is 256, the number of PBAs managed by the VDM fragment table is 512, and "number of PBAs managed by VDM fragment table/number of PBAs managed by LUT fragment table" is 2 (that is, y=2).

If N and M satisfy the above conditional expression in this way, for example, when the data corresponding to the 512 LBA ranges allocated to two LUT fragment tables corresponding to the second hierarchy is written to the non-volatile memory 4, the update of the LUT 41 can be completed by changing two entries included in the LUT fragment table corresponding to the third hierarchy. Similarly, when the data corresponding to the 512 LBA ranges is written to the 512 PBAs allocated to the VDM fragment table corresponding to the first hierarchy, the update of the VDM 42 can be completed by changing one entry included in the VDM fragment table corresponding to the second hierarchy.

That is, when N=16 and M=32, the ratio of the number of PBAs managed by the LUT fragment table corresponding to i hierarchy to the number of PBAs managed by the VDM fragment table corresponding to i−1 hierarchy is 1:2, and as described above, if the continuity of the LBA and PBA is secured, a change of two entries in the LUT fragment table can correspond to the update of the LUT 41, and a change of one entry of the VDM fragment table can correspond to the update of the VDM 42.

When N=16 and M=32, the above conditional expression is satisfied when x=2 and y=⅛. Although detailed description will be omitted, in this case, the ratio of the number of PBAs managed by the LUT fragment table corresponding to i hierarchy to the number of PBAs managed by the VDM fragment table corresponding to i−2 hierarchy is 8:1, and as described above, if the continuity of the LBA and PBA is secured, a change of one entry in the LUT fragment table can correspond to the update of the LUT 41, and a change of eight entries of the VDM fragment table can correspond to the update of the VDM 42.

FIG. 11 illustrates a relationship between the number of PBAs managed by the LUT fragment table and the number of PBAs managed by the VDM fragment table corresponding to each hierarchy when N=64 and M=32.

Here, when N=64 and M=32, the number of PBAs managed by the LUT fragment table corresponding to the first hierarchy is 64, and the number of PBAs managed by the VDM fragment table corresponding to the first hierarchy is 2,048. Further, the number of PBAs managed by the LUT fragment table corresponding to the second hierarchy is 4,096, and the number of PBAs managed by the VDM fragment table corresponding to the second hierarchy is 131,072.

Although detailed description of the number of PBAs managed by the LUT fragment table and the number of PBAs managed by the VDM fragment table corresponding to the hierarchy higher than the second hierarchy will be omitted, when N=64, both the number of PBAs managed by the LUT fragment table and the number of PBAs managed by the VDM fragment table are 64 times higher when the hierarchy is one level higher.

In addition, when N=64 and M=32, the above conditional expression is satisfied when x=0 and y=32. Specifically, when focusing on the LUT fragment table corresponding to the first hierarchy and the VDM fragment table corresponding to the first hierarchy, where the difference between the hierarchies is 0 (that is, x=0), the number of PBAs managed by the LUT fragment table is 64, the number of PBAs managed by the VDM fragment table is 2,048, and "number of PBAs managed by VDM fragment table/number of PBAs managed by LUT fragment table" is 32 (that is, y=32).

If N and M satisfy the above conditional expression in this way, for example, when the data corresponding to the 2,048 LBA ranges allocated to 32 LUT fragment tables corresponding to the first hierarchy is written to the non-volatile memory 4, the update of the LUT 41 can be completed by changing 32 entries included in the LUT fragment table corresponding to the second hierarchy. Similarly, when the data corresponding to the 2,048 LBA ranges is written to the 2,048 PBAs allocated to the VDM fragment table corresponding to the first hierarchy, the update of the VDM 42 can be completed by changing one entry included in the VDM fragment table corresponding to the second hierarchy.

That is, when N=64 and M=32, the ratio of the number of PBAs managed by the LUT fragment table corresponding to i hierarchy to the number of PBAs managed by the VDM fragment table corresponding to i hierarchy is 1:32, and as described above, if the continuity of the LBA and PBA is secured, a change of 32 entries in the LUT fragment table can correspond to the update of the LUT 41, and a change of one entry of the VDM fragment table can correspond to the update of the VDM 42.

When N=64 and M=32, the above conditional expression is satisfied when x=1 and y=½. Although detailed description will be omitted, in this case, the ratio of the number of PBAs managed by the LUT fragment table corresponding to i hierarchy to the number of PBAs managed by the VDM fragment table corresponding to i−1 hierarchy is 2:1, and as described above, if the continuity of the LBA and PBA is secured, a change of one entry in the LUT fragment table can correspond to the update of the LUT 41, and a change of two entries of the VDM fragment table can correspond to the update of the VDM 42.

FIG. 12 illustrates a relationship between the number of PBAs managed by the LUT fragment table and the number of PBAs managed by the VDM fragment table corresponding to each hierarchy when N=128 and M=32.

Here, when N=128 and M=32, the number of PBAs managed by the LUT fragment table corresponding to the first hierarchy is 128, and the number of PBAs managed by the VDM fragment table corresponding to the first hierarchy is 4,096. Further, the number of PBAs managed by the LUT fragment table corresponding to the second hierarchy is 16,384, and the number of PBAs managed by the VDM fragment table corresponding to the second hierarchy is 524,288.

Although detailed description of the number of PBAs managed by the LUT fragment table and the number of PBAs managed by the VDM fragment table corresponding to the hierarchy higher than the second hierarchy will be omitted, when N=128, both the number of PBAs managed by the LUT fragment table and the number of PBAs managed by the VDM fragment table are 128 times higher when the hierarchy is one level higher.

In addition, when N=128 and M=32, the above conditional expression is satisfied when x=0 and y=32. Specifically, when focusing on the LUT fragment table corresponding to the first hierarchy and the VDM fragment table corresponding to the first hierarchy, where the difference between the hierarchies is 0 (that is, x=0), the number of PBAs managed by the LUT fragment table is 128, the number of PBAs managed by the VDM fragment table is 4,096, and "number of PBAs managed by VDM fragment table/number of PBAs managed by LUT fragment table" is 32 (that is, y=32).

If N and M satisfy the above conditional expression in this way, for example, when the data corresponding to the 4,096 LBA ranges allocated to 32 LUT fragment tables corresponding to the first hierarchy is written to the non-volatile memory 4, the update of the LUT 41 can be completed by changing 32 entries included in the LUT fragment table corresponding to the second hierarchy. Similarly, when the data corresponding to the 4,096 LBA ranges is written to the 4,096 PBAs allocated to the VDM fragment table corresponding to the first hierarchy, the update of the VDM 42 can be completed by changing one entry included in the VDM fragment table corresponding to the second hierarchy.

That is, when N=128 and M=32, the ratio of the number of PBAs managed by the LUT fragment table corresponding to i hierarchy to the number of PBAs managed by the VDM fragment table corresponding to i hierarchy is 1:32, and as described above, if the continuity of the LBA and PBA is secured, a change of 32 entries in the LUT fragment table can correspond to the update of the LUT 41, and a change of one entry of the VDM fragment table can correspond to the update of the VDM 42.

When N=128 and M=32, the above conditional expression is satisfied when x=1 and y=¼. Although detailed description will be omitted, in this case, the ratio of the number of PBAs managed by the LUT fragment table corresponding to i hierarchy to the number of PBAs managed by the VDM fragment table corresponding to i−1 hierarchy is 4:1, and as described above, if the continuity of the LBA and PBA is secured, a change of one entry in the LUT fragment table can correspond to the update of the LUT 41, and a change of four entries of the VDM fragment table can correspond to the update of the VDM 42.

A case of M=32 has been illustrated in FIGS. 8 to 12 described above, and a case of M=64 will be described below with reference to FIGS. 13 to 17. Since the same as FIGS. 8 to 12 described above except that M is changed, FIGS. 13 to 17 will be described in a simplified manner as appropriate.

FIG. 13 illustrates a relationship between the number of PBAs managed by the LUT fragment table and the number of PBAs managed by the VDM fragment table corresponding to each hierarchy when N=64 and M=64.

When N=64 and M=64, the above conditional expression is satisfied when x=1 and y=1. That is, when N=64 and M=64, the ratio of the number of PBAs managed by the LUT fragment table corresponding to i hierarchy to the number of PBAs managed by the VDM fragment table corresponding to i−1 hierarchy is 1:1, and as described above, if the continuity of the LBA and PBA is secured, a change of one entry in the LUT fragment table can correspond to the update of the LUT 41, and a change of one entry of the VDM 42 can correspond to the update of the VDM 42.

As illustrated in FIG. 8 above, even when N=32 and M=32, it is possible to correspond to the update of the LUT 41 by changing one entry of the LUT fragment table, and to correspond to the update of the VDM 42 by changing one entry of the VDM 42. That is, in the present embodiment, it can be said that more efficient management of the LUT 41 and the VDM 42 can be realized when N=M.

FIG. 14 illustrates a relationship between the number of PBAs managed by the LUT fragment table and the number of PBAs managed by the VDM fragment table corresponding to each hierarchy when N=8 and M=64.

When N=8 and M=64, the above conditional expression is satisfied when x=2 and y=1. That is, when N=8 and M=64, the ratio of the number of PBAs managed by the LUT fragment table corresponding to i hierarchy to the number of PBAs managed by the VDM fragment table corresponding to i−2 hierarchy is 1:1, and as described above, if the continuity of the LBA and PBA is secured, a change of one entry in the LUT fragment table can correspond to the update of the LUT 41, and a change of one entry of the VDM 42 can correspond to the update of the VDM 42.

In this way, even if N=M is not satisfied, it may be possible to handle both the update of LUT 41 and the update of VDM 42 with one entry. According to this, it can be said that more efficient management of the LUT 41 and the VDM 42 can be realized even when $M=N^x$ is satisfied, for example.

FIG. 15 illustrates a relationship between the number of PBAs managed by the LUT fragment table and the number of PBAs managed by the VDM fragment table corresponding to each hierarchy when N=16 and M=64.

When N=16 and M=32, the above conditional expression is satisfied when x=1 and y=4. That is, when N=16 and M=64, the ratio of the number of PBAs managed by the LUT fragment table corresponding to i hierarchy to the number of PBAs managed by the VDM fragment table corresponding to i−1 hierarchy is 1:4, and as described above, if the continuity of the LBA and PBA is secured, a change of four entries in the LUT fragment table can correspond to the update of the LUT 41, and a change of one entry of the VDM fragment table can correspond to the update of the VDM 42.

When N=16 and M=64, the above conditional expression is satisfied when x=2 and y=¼. In this case, the ratio of the number of PBAs managed by the LUT fragment table corresponding to i hierarchy to the number of PBAs managed by the VDM fragment table corresponding to i−2 hierarchy is 4:1, and as described above, if the continuity of the LBA and PBA is secured, a change of one entry in the LUT fragment table can correspond to the update of the LUT 41, and a change of four entries of the VDM fragment table can correspond to the update of the VDM 42.

FIG. 16 illustrates a relationship between the number of PBAs managed by the LUT fragment table and the number of PBAs managed by the VDM fragment table corresponding to each hierarchy when N=32 and M=64.

When N=32 and M=64, the above conditional expression is satisfied when x=1 and y=2. That is, when N=32 and M=64, the ratio of the number of PBAs managed by the LUT fragment table corresponding to i hierarchy to the number of PBAs managed by the VDM fragment table corresponding to i−1 hierarchy is 1:2, and as described above, if the continuity of the LBA and PBA is secured, a change of two entries in the LUT fragment table can correspond to the update of the LUT 41, and a change of one entry of the VDM fragment table can correspond to the update of the VDM 42.

When N=32 and M=64, the above conditional expression is satisfied when x=2 and y=1/16. In this case, the ratio of the number of PBAs managed by the LUT fragment table corresponding to i hierarchy to the number of PBAs managed by the VDM fragment table corresponding to i−2 hierarchy is 16:1, and as described above, if the continuity of the LBA and PBA is secured, a change of one entry in the LUT fragment table can correspond to the update of the LUT 41, and a change of 16 entries of the VDM fragment table can correspond to the update of the VDM 42.

FIG. 17 illustrates a relationship between the number of PBAs managed by the LUT fragment table and the number of PBAs managed by the VDM fragment table corresponding to each hierarchy when N=128 and M=64.

When N=128 and M=64, the above conditional expression is satisfied when x=0 and y=64. That is, when N=128 and M=64, the ratio of the number of PBAs managed by the LUT fragment table corresponding to i hierarchy to the number of PBAs managed by the VDM fragment table corresponding to i hierarchy is 1:64, and as described above, if the continuity of the LBA and PBA is secured, a change of 64 entries in the LUT fragment table can correspond to the update of the LUT 41, and a change of one entry of the VDM fragment table can correspond to the update of the VDM 42.

When N=128 and M=64, the above conditional expression is satisfied when x=1 and y=½. In this case, the ratio of the number of PBAs managed by the LUT fragment table corresponding to i hierarchy to the number of PBAs managed by the VDM fragment table corresponding to i−1 hierarchy is 2:1, and as described above, if the continuity of the LBA and PBA is secured, a change of one entry in the LUT fragment table can correspond to the update of the LUT 41, and a change of two entries of the VDM fragment table can correspond to the update of the VDM 42.

In the present embodiment, the case of M=32 and the case of M=64 have been described, and the M may be determined to correspond to a calculation bit width (for example, 32 bits or 64 bits) in the memory system 3.

Hereinafter, the operation of the memory system 3 according to the present embodiment will be described. First, an example of the processing procedure of the memory system 3 when a write command is transmitted from the host 2 will be described with reference to the flowchart of FIG. 18.

In a case where the write command is transmitted from the host 2 as described above, the communication interface control unit 51 receives the write command (step S1). Here, the write command received in step S1 includes data written to the non-volatile memory 4 (hereinafter, referred to as target data) based on the write command and an LBA used to access the data (hereinafter, referred to as the target LBA). The target data is temporarily stored in the write buffer memory 52.

Next, the write control unit 561 writes the target data stored in the write buffer memory 52 to the non-volatile memory 4 via the non-volatile memory controller 54 (step S2). In the following description, the PBA in the non-volatile memory 4 in which the target data is written in step S2 is referred to as a target PBA for convenience.

When the process of step S2 is executed, the management unit 565 updates the VDM 42 based on the target PBA, for example, by cooperating with the non-volatile memory controller 54 and the cache memory control unit 566 (step S3). In this step S3, the VDM 42 is updated to manage that the target data is valid (that is, the data written to the target PBA is valid).

Here, in the present embodiment, the VDM 42 has a hierarchical structure and includes a plurality of VDM fragment tables corresponding to each hierarchy. In this case, in step S3, one or more VDM fragment tables to which the target PBA is allocated are specified by referring to the VDM 42, and the specified VDM fragment table is read from the non-volatile memory 4 as needed. The VDM fragment table read from the non-volatile memory 4 in this way is stored in the cache memory 551 and updated on the cache memory 551. In the case where the specified VDM fragment table described above is already stored in the cache memory 551, it is not necessary to read the VDM fragment table from the non-volatile memory 4.

Next, among the entries included in the VDM fragment table specified in this way, the entry to which the target PBA is allocated is changed. The VDM fragment table whose entry is updated in this way is read from the cache memory 551 and written back to the non-volatile memory 4.

The VDM fragment table whose entry is changed may be a VDM fragment table in a hierarchical structure or corresponding to the lowest hierarchy as described above, or may be a VDM fragment table corresponding to a hierarchy higher than the hierarchy.

Specifically, if the target PBA is a PBA in a relatively narrow range, and it is not possible to manage that the target data written to the target PBA is valid unless the entries included in the VDM fragment table corresponding to the lowest hierarchy are changed, the entries included in the VDM fragment table corresponding to the lowest hierarchy are changed. In this case, among the entries included in the VDM fragment table corresponding to the lowest hierarchy, the flag information (flag information corresponding to the target PBA) that constitutes the bitmap stored in the entry (map storing unit 42a) to which the target PBA is allocated is changed. Also, if the entire consecutive PBA ranges allocated to at least one entry in the VDM fragment table corresponding to the lowest hierarchy are the target PBAs, the magic number (management data MD2) stored in the entry is changed to "0xff".

On the other hand, if the target PBAs are consecutive PBAs in a relatively wide range, and it is possible to manage that the target data written to the target PBA is valid by changing the entries included in the VDM fragment table corresponding to hierarchies other than the lowest hierarchy, the entries included in the VDM fragment table corresponding to the hierarchies other than the lowest hierarchy may be changed. In this case, among the entries included in the VDM fragment table corresponding to the hierarchies other than the lowest hierarchy, the magic number (management data MD3) stored in the entry (PBA storing unit 42*f*) to which the target PBA is allocated is changed to "0xff".

If the entries included in the VDM fragment table corresponding to the hierarchy other than the lowest hierarchy are changed in this way, since the validity of the target data can be managed only by the VDM fragment table, the VDM fragment table (that is, the VDM fragment table indicated by the pointer stored in the entry) corresponding to the hierarchy lower than the VDM fragment table can be discarded.

On the other hand, if it is necessary to change the entries included in the VDM fragment table corresponding to the lowest hierarchy, which is a case where the VDM fragment table does not exist (discarded), a new VDM fragment table including the entry to which the target PBA is allocated is created.

In step S3, the VDM 42 stored in the non-volatile memory 4 can be updated by executing such a process. The writing back of the VDM 42 to the non-volatile memory 4 may be executed at any timing after step S3.

When the process of step S3 is executed, the management unit 565 updates the LUT 41 based on the write command (target LBA) and the target PBA, for example, by cooperating with the non-volatile memory controller 54 and the cache memory control unit 566 (step S4). In this step S4, the LUT 41 is updated so as to manage the correspondence between the target LBA and the target PBA (that is, the target LBA can be converted into the target PBA).

Here, in the present embodiment, the LUT 41 has a hierarchical structure and includes a plurality of LUT fragment tables corresponding to each hierarchy. In this case, in step S4, one or more LUT fragment tables to which the target LBA is allocated are specified by referring to the LUT 41, and the specified LUT fragment table is read from the non-volatile memory 4 as needed. The LUT fragment table read from the non-volatile memory 4 in this way is stored in the cache memory 551 and updated on the cache memory 551. In the case where the specified LUT fragment table described above is already stored in the cache memory 551, it is not necessary to read the LUT fragment table from the non-volatile memory 4.

Next, among the entries included in the LUT fragment table specified in this way, the entry to which the target LBA is allocated is changed. In this case, the PBA stored in the entry (PBA storing unit 41*a*) to which the target LBA is allocated is changed to the target PBA. The LUT fragment table whose entry is updated in this way is read from the cache memory 551 and written back to the non-volatile memory 4.

The LUT fragment table whose entry is changed may be a LUT fragment table in a hierarchical structure or corresponding to the lowest hierarchy as described above, or may be a LUT fragment table corresponding to a hierarchy higher than the hierarchy.

Specifically, if the target LBA is a LBA in a relatively narrow range, and it is not possible to manage the target LBA and correspondence of target PBA unless the entries included in the LUT fragment table corresponding to the lowest hierarchy are changed, the entries included in the LUT fragment table corresponding to the lowest hierarchy are changed.

On the other hand, if the target LBAs are consecutive LBAs in a relatively wide range, the target data is written to the consecutive PBAs, and it is possible to manage the target LBA and correspondence of target PBA by changing the entries included in the LUT fragment table corresponding to hierarchies other than the lowest hierarchy, the entries included in the LUT fragment table corresponding to the hierarchies other than the lowest hierarchy may be changed.

In step S4, the LUT 41 stored in the non-volatile memory 4 can be updated by executing such a process. The writing back of the LUT 41 to the non-volatile memory 4 may be executed at any timing after step S4.

When the process of step S4 is executed, the management unit 565 transmits a response (completion response) to the write command received in step S1 to the host 2 via the communication interface control unit 51 (step S5).

Here, the case where the LUT 41 and the VDM 42 are updated based on the write command from the host 2 has been described, but the LUT 41 and VDM 42 also need to be updated when, for example, the Trim command is transmitted from the host 2.

Hereinafter, an example of the processing procedure of the memory system 3 when a Trim command is transmitted from the host 2 will be described with reference to the flowchart of FIG. 19.

The Trim command is a command for invalidating the data corresponding to a predetermined file when the predetermined file is deleted in a file system used by the host 2, for example. The Trim command is also referred to as, for example, an Unmap command, in accordance with the interface standard for connecting the storage device. Note that, the Trim command does not erase the data written in the non-volatile memory 4, and the data is erased by garbage collection.

In a case where the Trim command is transmitted from the host 2 as described above, the communication interface control unit 51 receives the Trim command (step S11). The Trim command received in step S11 includes (range of) the LBAs for accessing the data to be invalidated. In the following description, the LBA included in the Trim command is referred to as a target LBA.

When the process of step S11 is executed, the address translation unit 564 refers to the LUT fragment table included in the LUT 41 in order from the higher hierarchy, and converts the target LBA into the PBA (step S12). As a result, the address translation unit 564 acquires the PBA corresponding to the target LBA. In the following description, the PBA acquired by the address translation unit 564 is referred to as a target PBA.

Next, the management unit 565 updates the VDM 42 to manage that the data (that is, the data corresponding to the target LBA) stored in the target PBA is invalid (step S13). Since the update process of the VDM 42 based on the Trim command is the same as the process indicated in step S3 illustrated in FIG. 18 except that the VDM 42 is updated so as to manage that the data is invalid, the detailed description thereof will be omitted here.

On the other hand, if the target PBAs are consecutive PBAs in a relatively wide range, and it is possible to manage that the target data written to the target PBA is invalid by changing the entries included in the VDM fragment table corresponding to hierarchies other than the lowest hierarchy, among the entries included in the VDM fragment table corresponding to the hierarchies other than the lowest hierarchy, the magic number stored in the entry to which the target PBA is allocated is changed to "0x00".

Also, if the entire consecutive PBA ranges allocated to at least one entry in the VDM fragment table corresponding to the lowest hierarchy are the target PBAs, the magic number stored in the entry is changed to "0x00".

Further, the management unit 565 updates the LUT 41 so as to invalidate the correspondence between the target LBA and the target PBA (the PBA in which the data to be invalidated is stored) (step S14). When invalidating the correspondence between the LBA and the PBA in the LUT 41, for example, a magic number is set in the entry (PBA storing unit 41a) included in the LUT fragment table to which the LBA is allocated. Since the update process of the LUT 41 based on the Trim command is the same as step S4 illustrated in FIG. 18 described above except that the correspondence between the LBA and the PBA is invalidated, the detailed description thereof will be omitted here.

When the LUT 41 and the VDM 42 are updated as described above, the management unit 565 transmits a response (completion response) to the Trim command to the host 2 via the communication interface control unit 51 (step S15).

Figure 19:
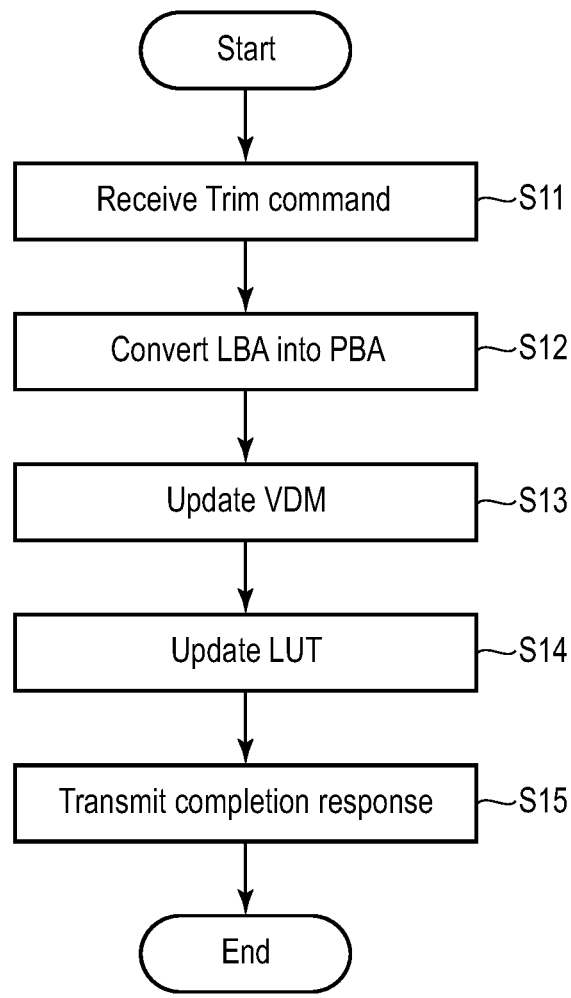
FIG. 19 is a flowchart illustrating an example of a processing procedure of the memory system according to the present embodiment when a Trim command is transmitted from a host.

In the example illustrated in FIG. 19, the completion response is transmitted to the host 2 after the LUT 41 and the VDM 42 are updated; however, for example, the VDM 42 update may be configured to be executed (that is, delayed) after the completion response is transmitted.

Here, the VDM 42 mentioned above is necessary for efficient garbage collection, and when the garbage collection is executed, it is necessary to refer to the VDM 42 and confirm whether the data written in each PBA in the non-volatile memory 4 is valid or invalid.

Hereinafter, referring to the flowchart of FIG. 20, an example of the processing procedure of the memory system 3, when confirming whether the data written in a specific PBA (hereinafter, referred to as a target PBA) in the non-volatile memory 4 is valid or invalid, will be described.

First, in the present embodiment, the VDM 42 has a hierarchical structure formed of a plurality of hierarchies, and the memory 55 holds a VDM pointer (PBA in which the VDM fragment table is stored) indicating a VDM fragment table corresponding to the highest hierarchy among the plurality of hierarchies. When the VDM fragment table corresponding to the highest hierarchy is stored in the non-volatile memory 4, the VDM pointer held in the memory 55 is the PBA in the non-volatile memory 4. When the VDM fragment table corresponding to the highest hierarchy is stored in the cache memory 551, the VDM pointer held in the memory 55 is the address information in the cache memory 551.

In this case, the management unit 565 reads the VDM fragment table from the non-volatile memory 4 or the cache memory 551 based on the VDM pointer held in the memory 55 (step S21).

Next, the management unit 565 refers to the magic number (hereafter, referred to as the target magic number) stored in the entry to which the target PBA is allocated, among the plurality of entries included in the VDM fragment table (VDM fragment table corresponding to the highest hierarchy) read in step S1 (step S22).

If the VDM fragment table read in step S21 is not the VDM fragment table corresponding to the lowest hierarchy, as the magic number (management data MD3) stored in the entry included in the VDM fragment table, one of the above-mentioned "0xff", "0x00", "0xfc", and "0xfd" is set.

The management unit 565 determines whether or not the target magic number referred to in this way is "0xff" or "0x00" (step S23).

When it is determined that the target magic number is not "0xff" or "0x00" (NO in step S23), the management unit 565 determines whether or not the target magic number is "0xfc" or "0xfd" (Step S24).

When it is determined that the target magic number is "0xfc" or "0xfd" (YES in step S24), the management unit 565 acquires the VDM pointer to which the target magic number is attached (step S25). When the process of step S25 is executed, the process returns to step S21 and the process is repeated.

Here, the magic number "0xfc" indicates that the VDM pointer (PBA) to which the magic number is attached is the PBA in the non-volatile memory 4 as described above. Therefore, when the target magic number is "0xfc", in step S21 executed after step S25, the VDM fragment table corresponding to the subsequent hierarchy (lower hierarchy) is read from the non-volatile memory 4 based on the VDM pointer acquired in step S24.

On the other hand, the magic number "0xfd" indicates that the VDM pointer (PBA) to which the magic number is attached is the address information in the cache memory 551 as described above. Therefore, when the target magic number is "0xfd", in step S21 executed after step S25, the VDM fragment table corresponding to the subsequent hierarchy (lower hierarchy) is read from the cache memory 551 based on the VDM pointer acquired in step S24.

In the present embodiment, by repeating the processes of steps S21 to S25 in this way, it is possible to sequentially refer to the VDM fragment table corresponding to each hierarchy.

On the other hand, it is assumed that the target magic number is determined to be "0xff" or "0x00" in step S23 (YES in step S23).

Here, the magic number "0xff" indicates that all the data written in the entire PBA ranges allocated to the entry in which the magic number is stored is valid. That is, when the target magic number is "0xff", it can be grasped that the data stored in the target PBA is valid, so that the process illustrated in FIG. 20 is terminated.

Further, the magic number "0x00" indicates that the data written in the entire PBA ranges allocated to the entry in which the magic number is stored is invalid. That is, when the target magic number is "0x00", it can be grasped that the data stored in the target PBA is invalid, so that the process illustrated in FIG. 20 is terminated.

If it is determined in step S24 that the target magic number is not "0xfc" or "0xfd" (NO in step S24), the magic numbers "0xff", "0x00", "0xfc", and "0xfd" are not set in the entry to which the target PBA is allocated. In this case, the VDM fragment table read in step S21 is the VDM fragment table corresponding to the lowest hierarchy, and it can be seen that the validity of the data stored in the range of PBA including the target PBA included in the VDM fragment table is not common (that is, valid data and invalid data are mixed). In this case, the management unit 565 acquires a bitmap stored in the entry to which the target PBA is allocated of the VDM fragment table (VDM fragment table corresponding to the lowest hierarchy) read in step S21 (step S26). The management unit 565 can grasp whether the data is valid or invalid based on the flag information indicating the validity of the data stored in the target PBA (that is, the flag information corresponding to the target PBA) among the plurality of flag information constituting the bitmap acquired in step S26.

As described above, in the present embodiment, the VDM 42 (data map) stored in the non-volatile memory 4 has a hierarchical structure formed of a plurality of hierarchies including at least the first hierarchy (the lowest hierarchy) and the second hierarchy (the hierarchy higher than the lowest hierarchy), and includes a plurality of first VDM fragment tables corresponding to the first hierarchy and a second VDM fragment table corresponding to the second hierarchy. Further, in the present embodiment, each of the plurality of first VDM fragment tables manages the validity of each data having a predetermined size (for example, 4 KiB) written in the PBA (physical address) range in the non-volatile memory 4 allocated to the first VDM fragment table. Further, in the present embodiment, the second VDM fragment table manages a VDM pointer (reference destination information for referencing the first VDM fragment table) indicating the first VDM fragment table for each first VDM fragment table.

Here, as described in the comparative example of the present embodiment described above, if the VDM 42' is formed of only the plurality of VDM fragment tables T421' corresponding to a single hierarchy, it is necessary to hold all the pointers (PBA in which the VDM fragment table T421' is stored) indicating each of the plurality of VDM fragment tables T421' in the memory 55. On the other hand, in the present embodiment, according to the above-described configuration, since it is sufficient as long as the VDM pointer indicating the VDM fragment table corresponding to the highest hierarchy is held in the memory 55, it is possible to reduce the data that continues to occupy a certain memory region on the memory 55 (VDM 42 management information is as close to 0 as possible), and thus the validity of the data written in the non-volatile memory 4 can be efficiently managed.

Moreover, in the present embodiment, by reducing the data (VDM pointer indicating the VDM fragment table) stored in memory 55 (for example, DRAM) as described above, the LUT 41 can be preferentially expanded on the memory 55 (cached in the cache memory 551), and thereby, the response time (I/O response time) to the command from the host 2 can be shortened. Note that, the VDM 42 does not need to be updated when process for the read command from host 2 is executed, the I/O response time can be further shortened. Further, when the process for the Trim command described above is executed, the process of updating the VDM 42 may be delayed. In such a configuration, the memory region (that is, the memory ratio) allocated to the LUT 41 and the VDM 42 may be dynamically changed.

Further, in the comparative examples of the present embodiment, as described above, it takes time for an internal process (starting process and terminating process) when starting and terminating the memory system 3; however, in the present embodiment, at the time of starting process, the VDM pointer indicating the VDM fragment table corresponding to the highest hierarchy may be expanded in the memory 55, and at the time of terminating process, the VDM pointer may be made non-volatile, so that the time required for internal process can be shortened.

Moreover, in the present embodiment, in a case where the validity of each data having a predetermined size written in the PBA range allocated to the first VDM fragment table is not common (that is, valid data and invalid data are mixed as the data written in the PBA range), the second VDM fragment table manages the VDM pointer that indicates the first VDM fragment table corresponding to the lower hierarchy. Further, in a case where the validity of each data having a predetermined size written in the PBA range allocated to the first VDM fragment table is common (that is, all of the data having a predetermined size written in the PBA range is valid or invalid), the second VDM fragment table manages the validity of the data collectively.

In the present embodiment, with such a configuration, for example, when updating the validity of data written in wide consecutive PBA ranges, since the VDM 42 can be updated only by changing the entry (magic number) included in the second VDM fragment table, the process for managing the validity of data can be simplified. Specifically, for example, in a case of the memory system 3 (non-volatile memory 4) capable of storing several PiB data, for example, it is possible to collectively operate (update) several G PBA ranges by simply changing the magic number (8 bits) stored in one entry included in the VDM fragment table corresponding to the highest hierarchy.

That is, in the present embodiment, it is possible to suppress bit operations such as updating the bitmaps included in the first VDM fragment table individually, and to reduce the processing cost.

Further, in the present embodiment, since the PBA ranges (granularity) allocated to the VDM fragment table are different depending on the hierarchy, the VDM 42 can be flexibly updated.

Further, for example, in the second VDM fragment table, when managing the validity of each data having a predetermined size written in the PBA ranges allocated to the first VDM fragment table collectively, the memory region in which the first VDM fragment table is stored can be released by destroying the first VDM fragment table. According to this, in the present embodiment, it is possible to reduce the memory region required for storing the VDM 42.

Further, in the present embodiment, the first VDM fragment table corresponding to the first hierarchy and the second VDM fragment table corresponding to the second hierarchy have the same data structure. Specifically, the first VDM fragment table manages the validity of the data having a predetermined size (4 KiB) for each predetermined number of (for example, 32) entries. In addition, the second VDM fragment table manages the VDM pointer indicating each of the first VDM fragment data for each predetermined number of (for example, 32) entries.

In the present embodiment, such a configuration simplifies the hierarchical structure of the VDM 42, and can reduce the calculation cost when referring to the VDM 42 (each VDM fragment table). Also, for example, in order to refer to the VDM fragment table to which the target PBA is allocated, it is necessary to go through the plurality of hierarchies, and since the process in such a case can be made uniform regardless of the hierarchy (that is, the same software code can be used), the VDM 42 can be referred to efficiently.

The VDM 42 in the present embodiment may have a hierarchical structure including at least the first and second hierarchies; however, the number of hierarchies constituting the hierarchical structure of the VDM 42 may be 3 or more. The number of hierarchies constituting the hierarchical structure of the VDM 42 may be appropriately changed based on, for example, the storage capacity (the number of PBAs) of the non-volatile memory 4.

Further, in the present embodiment, similar to the VDM 42, the LUT 41 (address translation table) also has a hierarchical structure, and each of the plurality of LUT fragment tables included in the LUT 41 has the same data structure as the VDM fragment table included in the VDM 42.

According to such a configuration, even when tracing a plurality of hierarchies to refer to the LUT 41, the same software code as the VDM 42 can be used, so that efficient process can be realized. Further, for example, the LUT 41 (LUT fragment table) and the VDM 42 (VDM fragment table) updated on the cache memory 551 need to be written back to the non-volatile memory 4 (that is, made non-volatile), and since the LUT fragment table and the VDM fragment table are configured to have the same size, the LUT fragment table and the VDM fragment table can be collectively made non-volatile without distinction. According to this, the writing efficiency of the LUT fragment table and the VDM fragment table to the non-volatile memory 4 can be improved, and the non-volatile cost can be reduced.

In the present embodiment, since the number of PBAs managed by the LUT fragment table corresponding to the lowest hierarchy is smaller than the number of PBAs managed by the VDM fragment table corresponding to the hierarchy, the number (first number) of hierarchies constituting the hierarchical structure of the VDM 42 is smaller than the number (second number) of hierarchies constituting the hierarchical structure of the LUT 41.

Moreover, in the present embodiment, the number N of entries in the VDM fragment table so as to satisfy the above conditional expression (M=y×N^x) and the number M of data (that is, the PBA managed in the entry) having a predetermined size whose validity is managed in one entry of the VDM fragment table corresponding to the lowest hierarchy are determined, and the LUT fragment table and the VDM fragment table are configured to have the same data structure.

In the present embodiment, with such a configuration, the LUT 41 can be updated only by changing the entry (PBA) included in the LUT fragment table corresponding to the higher hierarchy, and the VDM 42 can be updated simply by changing the entry (magic number) included in the VDM fragment table without changing the bitmap (performing bit manipulation). Therefore, in the present embodiment, it is possible to achieve both efficient management of the correspondence between the LBA and the PBA in the LUT 41 and efficient management of data validity in the VDM 42.

In addition, in order to realize more efficient management in the LUT 41 and the VDM 42, N and M that satisfy the conditional expression M=N^x (that is, M is a power of N) may be employed as illustrated in FIG. 14 above, such as N=8 and M=64, and N and M that satisfy the conditional expression M=N (that is, M is equal to N), such as N=32 and M=32 illustrated in FIG. 8 and N=64 and M=64 illustrated in FIG. 13, may be employed. Further, (values of) N and M may be configured to be appropriately set or changed by the administrator of the memory system 3 or the like.

Here, for example, the pointer size in C language is the same as the calculation bit width. In this case, for example, if M is smaller than the calculation bit width, the pointer (address information in the cache memory 551) cannot be stored as it is in the entry of the fragment table. For this, it is conceivable to divide and store the pointer, but the processing cost is high.

On the other hand, if M is larger than the calculation bit width, it is possible to store the pointer as it is in the entry of the fragment table, but it is not efficient because there are unused bits (the cache is wasted). Further, in this case, the size of the fragment table becomes large, so that the non-volatile cost increases. For this, for example, it is conceivable to execute a process of excluding unnecessary parts before making the fragment table non-volatile, but the processing cost is high.

Therefore, in the present embodiment, M may be determined so as to correspond to (for example, match) the calculation bit width (32 bits or 64 bits) in the memory system 3, for example. According to such a configuration, since the pointer (address information in cache memory 551) having the same calculation bit width and size can be stored in the entry of the fragment table without processing, the LUT 41 and the VDM 42 can be efficiently managed. Further, according to such a configuration, it is not necessary to unnecessarily increase the size of the fragment table.

In the present embodiment, although it has been described that the controller 5 included in the memory system 3 functions as a flash translation layer (FTL) configured to perform data management and block management of the non-volatile memory 4 (NAND type flash memory), the function as the FTL may be possessed by the host 2 side connected to the memory system 3. In the case of such a configuration, the LUT 41 and the VDM 42 described in the present embodiment are managed by the host 2, and the update process or the like of the LUT 41 and the VDM 42 is executed on the host 2 side. In the case of such a configuration, the address translation from the LBA to the PBA may also be executed on the host 2 side, and the command from the host 2 (for example, the read command) in this case may include the PBA.

Next, controlling performed by the VDM 42 structured as above, that is, the memory system 3 with a data map of the present embodiment in order to decrease processing costs of the data map will be explained.

As described above, the memory cell array of the non-volatile memory 4 includes a plurality of blocks, and each of the blocks includes many pages. In the memory system 3 (SSD), each block functions as an erase unit of data. Furthermore, each page is a unit of data write operation and data read operation. The size of block is an integral multiple of the size of data by which the validity is collectively managed by the management data MD3 of the second VDM fragment table T422, for example (in this example, 4 KiB× 32×32=4 MiB).

Figure 21:
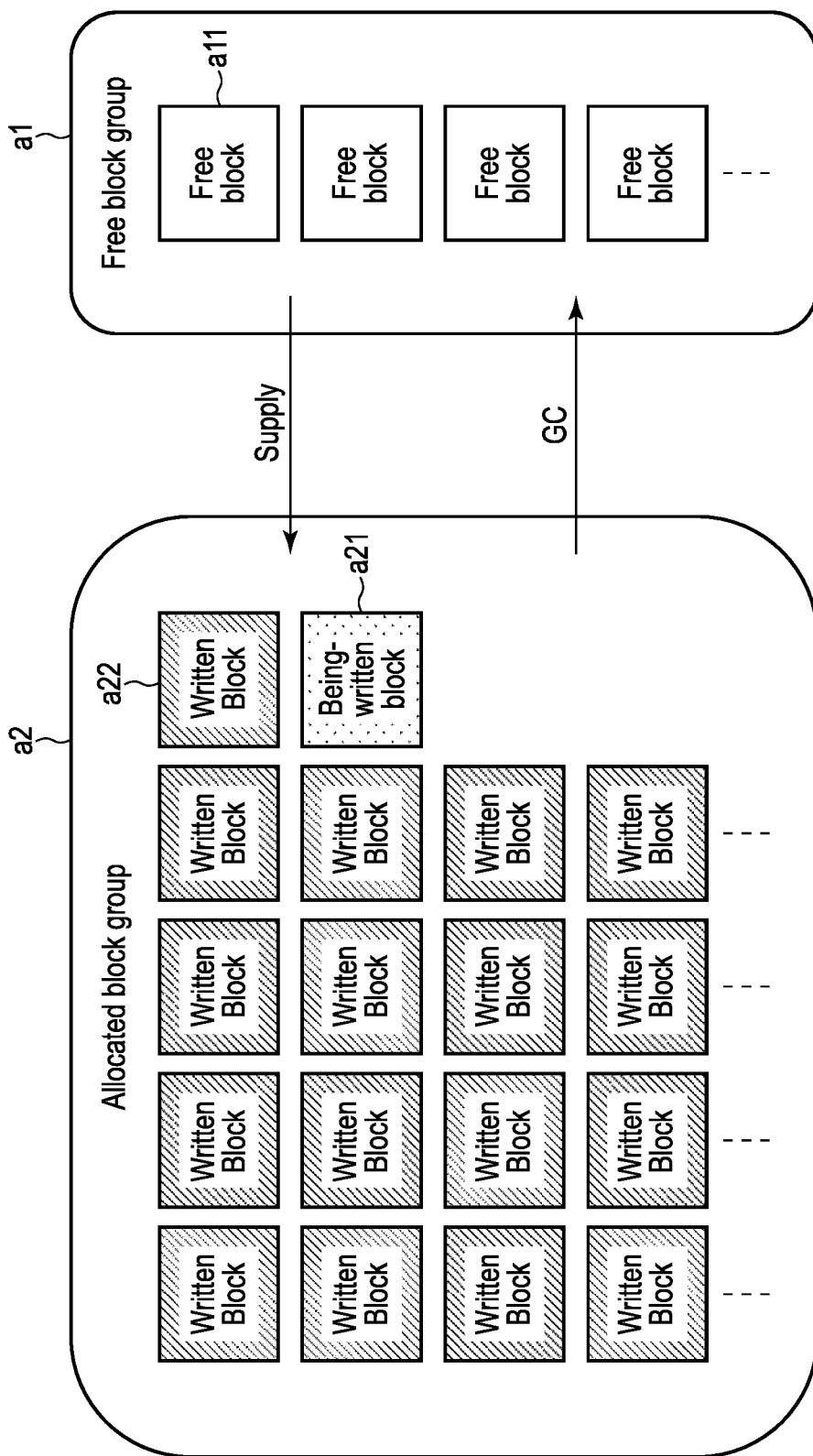
FIG. 21 is a diagram illustrating a conventional mode where a plurality of blocks included in the non-volatile memory are used cyclically as a comparative example.

Here, a conventional model in which each of the blocks is cyclically used will be explained as a comparative example with reference to FIG. 21. Note that, in this example, the comparative example will be explained using the structure of the memory system 3 of the present embodiment (write control unit 561 and garbage collection control unit 563).

The blocks will be roughly divided into blocks of a free block group a1 (free block a11) and blocks of an allocated block group a2 (being-written blocks a21 and written blocks a22).

The free block a11 is a block to which data is not written. Upon supply of the free block a11, the write control unit 561 writes write data requested to be written to the non-volatile memory 4 by a write command from the host 2. When the write data is written, the block transits to a being-written block a21 from the free block a11. That is, the being-written block a21 is a write destination block of data designated by the write control unit 561.

While there is an empty page in the being-written block a21, the write control unit 561 executes write of the write data with respect to the being-written block a21. When the write data is written to all pages of the being-written block a21, the block transits to a written block a22 from the being-written block a21. That is, the written block a22 is a block to which data write by the write control unit 561 has been completed. Upon completion of data write to a being-written block 21, the write control unit 561 receives supply of a new free block al1, and executes write of write data.

As the above step proceeds, the number of free blocks al1 decreases while the number of written blocks a22 increases. Furthermore, in an SSD which cannot perform overwrite of data, the update of data is executed by invalidating before-update data stored in a page, and writing updated data in a different page. Thus, there may be a condition where invalid data occupies the majority of a written block a22.

The garbage collection control unit 563 moves valid data in N written blocks a22 in which many invalid data exist to M blocks (M<N) to create N-M free blocks al1. That is, through garbage collection (GC) by the garbage collection control unit 563, the written blocks a22 partly transit to free blocks al1.

As above, each of the blocks will be cyclically used from free block al1 to being-written block a21, from being-written block a21 to written block a22, and from written block a22 to free block al1.

Now, with reference to FIG. 22, the size of data used to manage the validity by the flag information and various kinds of management data (MD2, and MD3) of the data map (VDM 42) in the memory system 3 of the present embodiment will be reviewed. In FIG. 22, symbol b1 indicates the size of data validity of which is managed by the flag information of the first VDM fragment table T421. The flag information represents the validity of the data written in one PBA (4 KiB, in this example) in one bit.

As described above, the first VDM fragment table T421 includes, for example, 32 entries. In each entry, for example, 32 flag information are included. Those 32 flag information of each entry form 32-bit bitmap in which each bit is indicative of validity of 4 KiB data with respect to the data written in the 32 PBAs (4 KiB×32=128 KiB data).

Symbol b2 indicates the size of data validity of which is managed by the management data MD2 of the first VDM fragment table T421. One management data MD2 is provided with each entry of the first VDM fragment table T421. To the management data MD2, a magic number collectively representing the validity of 128 KiB data indicated by the 32-bit bitmap formed by the flag information may be set. That is, the management data MD2 can collectively represent the validity of 128 KiB data.

Symbol b3 indicates the size of data validity of which is managed by the management data MD3 of the second VDM fragment table T422. One management data MD3 is provided with one first VDM fragment table T421. To the management data MD3, a magic number collectively representing the validity of 128 KiB×32=4 MiB indicated by the 32 management data MD2 of the first VDM fragment table T421 (validity of data written in 1024 PBAs indicated by 32×32=1024 flag information) may be set. That is, the management data MD3 can collectively represent the validity of 4 MiB.

In the memory system 3 of the present embodiment which comprises the data map (VDM 42) including the flag information and the management data (MD2 and MD3), if all data written in one block are, for example, an integral multiple of the size of data validity of which can be collectively managed by the management data MD2 (128 KiB), the operation of the flag information (bit operation) becomes unnecessary. Furthermore, for example, if they are an integral multiple of the size of data validity of which can be collectively managed by the management data MD3 (4 MiB), the operation of the management data MD2 further becomes unnecessary.

In other words, if data written in one block are, for example, less than the size of data validity of which can collectively managed by the management data MD2 (128 KiB), or are an integral multiple of such a size+data size of which is below such a size (data including a fraction below such a size), the operation of the flag information becomes necessary. Thus, the write data of the host 2 is preferred to be set to be an integral multiple of the size of data (128 KiB) validity of which can be collectively managed by the management data MD2, or furthermore, set to be an integral multiple of the size of data validity of which can collectively managed by the management data MD3 (4 MiB).

However, the host 2 generates highly frequent data accesses of very small size which is, for example, below 4 KiB with respect to the memory system 3 in conjunction with a file system used to manage files, directories, and the like by an operating system (OS). Furthermore, the host 2 may vary a unit of data accesses with respect to the memory system 3 based on, for example, processes of application programs operated under control of the OS.

A hypothetical situation where the write control unit 561 receives supply of the free block al1 and writes data size of which is smaller than the size of data validity of which can be collectively managed by the management data MD2 (128 KiB) will be considered. In that case, even if the data size of which is an integral multiple of the data validity of which can be collectively managed by the management data MD2 (128 KiB) is sent next time, the operation of the flag information becomes necessary thereinafter with respect to a part of (fractions before and after) the write data to be written in the being-written block a21 following the data directly before thereof (transitioning from the free block al1).

In consideration of this point, one of the usage models of the blocks of the memory system 3 of the present embodiment will be explained with reference to FIG. 23.

In the memory system 3 of the present embodiment, the write control unit 561 writes the write data to the free block al1. A difference from the above comparative example is that the write control unit 561 of the present embodiment secures various kinds of being-written blocks a21 which are data write destinations based on the size of the write data (for example, first block a21-1, second block a21-2, and third block a21-3). Specifically, the write control unit 561 controls the data write such that data size of which is less than the data validity of which can be collectively managed by the management data MD2 (128 KiB), or an integral multiple of the size+data size of which is below the size, and data size of which is an integral multiple (data including fragments which are below the size) do not mix in one block. In other words, the write control unit 561 collects data requiring the operation by the flag information in the same kind of block.

Note that, as explained in the above comparative example, each of the blocks is used cyclically from free block al1 to being-written block a21, from being-written block a21 to written block a22, and from written block a22 to free block al1. Thus, if the block using writing as the first block a21-1 transits from the written block a22 to the free block al1, the block may be supplied to the write control unit 561 as any of the first to third blocks a21-1, a21-2, and a21-3 in the next cycle instead of the first block a21-1. That is, each block has not been preliminarily associated with any of the first to third blocks a21-1, a21-2, and a21-3.

Or, at each time when each block transits from a state where the block is associated with a free block group a1 to a state where the block is associated with an allocated block group a2, many pages of the block may be determined. That is, many pages of each of the blocks may be arbitrarily rearranged.

FIG. 24 is a diagram illustrating one example of selecting a write destination block by the write control unit 561 of the present embodiment.

Initially, the write control unit 561 determines whether or not the size of write data of the host 2 is an integral multiple of the size of data validity of which can be collectively managed by the management data MD2 (128 KiB). If it is not an integral multiple of 128 KiB, the write control unit 561 selects the second block a21-2 as the write destination of the write data at that time. That is, the second block a21-2 is a block collecting data requiring the operation of the flag information.

If it is an integral multiple of 128 KiB, the write control unit 561 then determines whether or not the size of the write data of the host 2 is an integral multiple of the size of the data validity of which can be collectively managed by the management data MD3 (4 MiB). Note that, in this example, the data map (VDM 42) has a hierarchical structure including the first VDM fragment table T421 (first hierarchy [lowest hierarchy]) and the second VDM fragment table T422 (second hierarchy [upper layer of the first hierarchy]); however, if the data map does not have a hierarchical structure with only the first VDM fragment table T421, the write control unit 561 may select the first block a21-1 as the write destination of the write data when the size of the write data of the host 2 is determined an integral multiple of 128 KiB.

If it is not an integral multiple of 4 MiB, the write control unit 561 selects the first block a21-1 as the write destination of the write data. The first block a21-1 is a data block which does not require the operation the flag information but requires the operation of the management data MD2. On the other hand, if it is an integral multiple of 4 MiB, the write control unit 561 selects the third block a21-3 as the write destination of the write data. The third block a21-3 is a data block which does not require the operation of the flag information and the management data MD2 but the operation of the management data MD3.

If data is being written to the first block a21-1 and the block is full, the write control unit 561 does not select the second block a21-2 or the third block a21-3 as the write destination of the data even if there is an empty space therein, and receives the supply of a new free block all as the first block a21-1 to execute write of the remaining data.

As above, the write destination blocks are switched based on the size of the write data of the host 2, and thus, in the memory system 3 of the present embodiment, the operation of the flag information (bit operation) is not required with respect to the first block a21-1 and the third block a21-3 which are other than the second block a21-2 at the data write time and data update time (invalidation time of pre-update data). The operation of the management data MD2 becomes further unnecessary with respect to the third block a21-3.

Furthermore, in the garbage collection (GC), with respect to a block which transits from the first block a21-1 which is one of the being-written blocks a21 to the written block a22, reference of the flag information (bit scan) becomes unnecessary when the valid data in the block is moved. The block which transits from the third block a21-3 to the written block a22 does not require reference of the management data MD2. Not only the transition original block but also the transition destination block, the operation of the flag information is not necessary, the operation of the management data MD2 and the management data MD3, or the operation of the management data MD3 alone suffice.

Furthermore, in the garbage collection (GC), if the block which transits to the written block a22 from the first block a21-1 or the third block a21-3 is selected as a target, an effect of overhead reduction will be expected. For example, if the page size is 16 KiB and only 4 KiB therein is valid, there will be a 12 KiB unnecessary read in an operation of 16 KiB read and 4 KiB write. In the block which transits to the written block a22 from the first block a21-1 or the third block a21-3, only the large data of 128 KiB unit or 4 MiB unit may exist, and such an unnecessity does not occur. Furthermore, read of valid data and write of the valid data to the transition destination can be executed in a bulk size of multiple pages.

Furthermore, if the data map (VDM 42) has a hierarchical structure, switching of the write destination blocks based on the size of write data maintains address continuity, and a compression rate of the table compression increases, and thus, memory capacity secured on the memory 55 for the data map can be reduced. The reduced amount of the memory capacity can be used for performance improvement of the memory system 3, or the capacity of the memory 55 can be minimized.

FIG. 25 is a flowchart illustrating an example of an order of selection of write destination blocks based on a data size, which is included in the data write operation of the memory system 3 of the present embodiment, as explained with reference to FIG. 18. The order is executed by the write control unit 561 in step S2 of FIG. 18.

The write control unit 561 determines whether or not the data size is an integral multiple of 128 KiB (so the validity thereof can be collectively managed by the management data MD2) (step S31). If it is not an integral multiple of 128 KiB (NO in step S31), the write control unit 561 selects the second block a21-2 as a write destination of data (step S32).

If it is an integral multiple of 128 KiB (YES in step S31), the write control unit 561 then determines whether or not the data size is an integral multiple of 4 MiB (so the validity thereof can be collectively managed by the management data MD3) (step S33). If it is an integral multiple of 4 MiB (YES in step S33), the write control unit 561 selects the third block a21-3 as a write destination of data (step S34). On the other hand, if it is not an integral multiple of 4 MiB (NO in step S33), the write control unit 561 selects the first block a21-1 as a write destination of data (step S35).

As above, the memory system 3 of the present embodiment, switching of write destination blocks based on the data size, the process costs of the data map (VDM 42) can be suppressed.

Note that, as explained above, the host 2 may include a function as an FTL, and LUT 41 and VDM 42 may be managed by the host 2, and an update process and the like of the LUT 41 and the VDM 42 may be executed in the host 2 side. In that case, selection of write destination blocks to suppress the process costs of the data map may be executed in the host 2 side. Furthermore, in that case, number M of data validity of which is managed in one entry of the first VDM fragment table T421 corresponding to the lowest hierarchy (PBA storing the data) may be determined to correspond to a calculation bit width of the host 2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, comprising:
a non-volatile memory including a plurality of blocks, each of the plurality of blocks being a unit of a data erase operation; and
a controller electrically connected to the non-volatile memory and configured to:
manage validity of data written in the non-volatile memory by using at least first information and second information, the first information indicative of the validity of first data having a first size, the second information indicative of the validity of second data having a second size, the second data including a plurality pieces of the first data each having the first size;
receive, from the host, a first write command requesting to write third data having a third size to the non-volatile memory;
compare the third size with the second size; and
select a write destination block from the plurality of blocks to write the third data based on the comparison between the third size and the second size.

2. The memory system of claim 1, wherein
the controller is configured to:
select a first block as the write destination block when the third size is an integral multiple of the second size; and
select a second block as the write destination block when the third size is not an integral multiple of the second size.

3. The memory system of claim 2, wherein
the controller is configured to:
when the first block is filled with written data and the second block includes an available space for writing additional data,
in response to receiving, from the host, a second write command requesting to write data having a size that is an integral multiple of the second size, select a third block, not the second block, as the write destination block for the second write command.

4. The memory system of claim 2, wherein
the controller is configured to:
select the first block as the write destination block dedicatedly for a plurality of third write commands each requesting to write data having a size that is an integral multiple of the second size; and
select the second block as the write destination block dedicatedly for a plurality of fourth write commands each requesting to write data having a size that is not an integral multiple of the second size.

5. The memory system of claim 1, wherein
the controller is configured to:
select a first block as the write destination block when the third size is larger than or equal to the second size; and
select a second block as the write destination block when the third size is smaller than the second size.

6. The memory system of claim 1, wherein
the controller is configured to:
manage the validity of the data written in the non-volatile memory further by using third information, the third information indicative of the validity of fourth data having a fourth size, the fourth data including a plurality pieces of the second data each having the second size;
compare the third size with the fourth size; and
select the write destination block from the plurality of blocks to write the third data further based on the comparison between the third size and the fourth size.

7. The memory system of claim 6, wherein
the controller is configured to:
select a first block as the write destination block when the third size is an integral multiple of the second size and the third size is not an integral multiple of the fourth size;
select a second block as the write destination block when the third size is not an integral multiple of the second size; and
select a third block as the write destination block when the third size is an integral multiple of the second size and the third size is an integral multiple of the fourth size.

8. The memory system of claim 1, wherein
the controller is configured to manage the validity of the data written in the non-volatile memory further by using a bitmap in which a plurality pieces of the first information are arranged, and
validity of the bitmap is indicated by the second information.

9. The memory system of claim 1, wherein
the controller is configured to manage the validity of the data written in the non-volatile memory further by using a data map,
the data map has a hierarchical structure including at least a first hierarchy and a second hierarchy higher than the first hierarchy, and includes at least a first table corresponding to the first hierarchy and a second table corresponding to the second hierarchy,
the first table stores the first information, and the second table stores the second information and fourth information indicating a location where the first table is stored.

10. The memory system of claim 1, wherein
a size of the first information is smaller than a size of the second information.

11. A method of controlling a non-volatile memory, the non-volatile memory including a plurality of blocks, each of the plurality of blocks being a unit of a data erase operation, the method comprising:
managing validity of data written in the non-volatile memory by using at least first information and second information, the first information indicative of the validity of first data having a first size, the second information indicative of the validity of second data having a second size, the second data including a plurality pieces of the first data each having the first size;
receiving, from a host, a first write command requesting to write third data having a third size to the non-volatile memory;
comparing the third size with the second size; and
selecting a write destination block from the plurality of blocks to write the third data based on the comparison between the third size and the second size.

12. The method of claim 11, further comprising:
determining whether the third size is an integral multiple of the second size; and
selecting the write destination block according to the determination on whether the third size is the integral multiple of the second size.

13. The method of claim 12, further comprising:
determining that the third size is the integral multiple of the second size;
in response to determining that the third size is the integral multiple of the second size, selecting a first block as the write destination block;
determining that the first block is filled with written data and a second block includes an available space for writing additional data;
receiving, from the host, a second write command requesting to write data having a size that is an integral multiple of the second size; and
in response to receiving the second write command, selecting a third block, not the second block, as the write destination block for the second write command.

14. The method of claim 11, further comprising:
selecting a first block as the write destination block dedicatedly for a plurality of third write commands each requesting to write data having a size that is an integral multiple of the second size; and
selecting a second block as the write destination block dedicatedly for a plurality of fourth write commands each requesting to write data having a size that is not an integral multiple of the second size.

15. The method of claim 11, further comprising:
determining whether the third size is larger than or equal to the second size; and
selecting the write destination block according to the determination on whether the third size is larger than or equal to the second size.

16. The method of claim 11, further comprising:
managing the validity of the data written in the non-volatile memory further by using third information, the third information indicative of the validity of fourth data having a fourth size, the fourth data including a plurality pieces of the second data each having the second size;
comparing the third size with the fourth size; and
selecting the write destination block from the plurality of blocks to write the third data further based on the comparison between the third size and the fourth size.

17. The method of claim 16, further comprising:
determining whether the third size is an integral multiple of the second size;
determining whether the third size is an integral multiple of the fourth size; and
selecting the write destination block according to both (A) the determination on whether the third size is the integral multiple of the second size and (B) the determination on whether the third size is the integral multiple of the fourth size.

18. The method of claim 11, further comprising:
managing the validity of the data written in the non-volatile memory further by using a bitmap in which a plurality pieces of the first information are arranged, wherein
validity of the bitmap is indicated by the second information.

19. The method of claim 11, further comprising:
managing the validity of the data written in the non-volatile memory further by using a data map, wherein
the data map has a hierarchical structure including at least a first hierarchy and a second hierarchy higher than the first hierarchy, and includes at least a first table corresponding to the first hierarchy and a second table corresponding to the second hierarchy,
the first table stores the first information, and
the second table stores the second information and fourth information indicating a location where the first table is stored.

20. The method of claim 11, wherein
a size of the first information is smaller than a size of the second information.

* * * * *